(12) United States Patent
Morohoshi

(10) Patent No.: US 9,028,077 B2
(45) Date of Patent: May 12, 2015

(54) PROJECTOR

(75) Inventor: Hiroshi Morohoshi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 126 days.

(21) Appl. No.: 13/589,570

(22) Filed: Aug. 20, 2012

(65) Prior Publication Data

US 2013/0050657 A1 Feb. 28, 2013

(30) Foreign Application Priority Data

Aug. 30, 2011 (JP) .................................. 2011-186743

(51) Int. Cl.
G03B 21/14 (2006.01)
G03B 21/16 (2006.01)

(52) U.S. Cl.
CPC .............. *G03B 21/145* (2013.01); *G03B 21/16* (2013.01)

(58) Field of Classification Search
CPC ......... G03B 21/00; G03B 21/14; G03B 21/20
USPC .................................................. 353/119, 122
See application file for complete search history.

(56) References Cited

U.S. PATENT DOCUMENTS

| 5,876,105 | A | * | 3/1999 | Rodriquez, Jr. ................ 353/119 |
| D449,636 | S | | 10/2001 | Gotham et al. |
| 6,715,890 | B2 | * | 4/2004 | Huang et al. .................. 353/119 |
| D495,354 | S | | 8/2004 | Oross et al. |
| 7,048,388 | B2 | | 5/2006 | Takaura et al. |
| 2005/0007558 | A1 | * | 1/2005 | Shiraishi et al. ................ 353/61 |
| 2005/0094106 | A1 | * | 5/2005 | Nakamura ....................... 353/57 |
| 2007/0211229 | A1 | | 9/2007 | Kitahara |
| 2007/0291234 | A1 | | 12/2007 | Momose et al. |
| 2008/0111976 | A1 | | 5/2008 | Takito et al. |
| 2008/0204673 | A1 | | 8/2008 | Hirata et al. |
| 2011/0025991 | A1 | | 2/2011 | Hirata et al. |
| 2013/0162961 | A1 | | 6/2013 | Hirata et al. |

FOREIGN PATENT DOCUMENTS

| CN | 101034251 A | 9/2007 |
| CN | 101090627 A | 12/2007 |
| CN | 101324746 A | 12/2008 |
| CN | 102087463 A | 6/2011 |
| EP | 1965254 | 9/2008 |

(Continued)

OTHER PUBLICATIONS

European Office Action dated Jan. 15, 2013 issued in corresponding European Application No. 12181295.2.

(Continued)

*Primary Examiner* — William C Dowling
*Assistant Examiner* — Jerry Brooks
(74) *Attorney, Agent, or Firm* — Harness, Dickey & Pierce, P.L.C.

(57) ABSTRACT

A projector includes a housing, an image projection unit, and a plurality of connection ports including a power connection port. The housing has a top face, and a first face and a second face adjacent to each other, and a light projection port on the top face. The image projection unit includes an optical system to project light corresponding to image data, via the light projection port disposed on the top face, in an upward oblique direction with respect to the first face. The plurality of connection ports is disposed on the second face. The power connection port is disposed at a position in the second face closest to the first face side.

20 Claims, 16 Drawing Sheets

(56) References Cited

FOREIGN PATENT DOCUMENTS

| | | |
|---|---|---|
| JP | 08-314006 | 11/1996 |
| JP | 2000-162702 | 6/2000 |
| JP | 2003-215710 | 7/2003 |
| JP | 2004-029356 | 1/2004 |
| JP | 2004-264388 | 9/2004 |
| JP | 2005-316250 | 11/2005 |
| JP | 2008-158495 | 7/2008 |
| WO | WO2006/058884 A1 | 6/2006 |

OTHER PUBLICATIONS

Chinese Office Action dated Jun. 25, 2014 for corresponding Chinese Application No. 201210300684.8.

* cited by examiner

FIG. 11
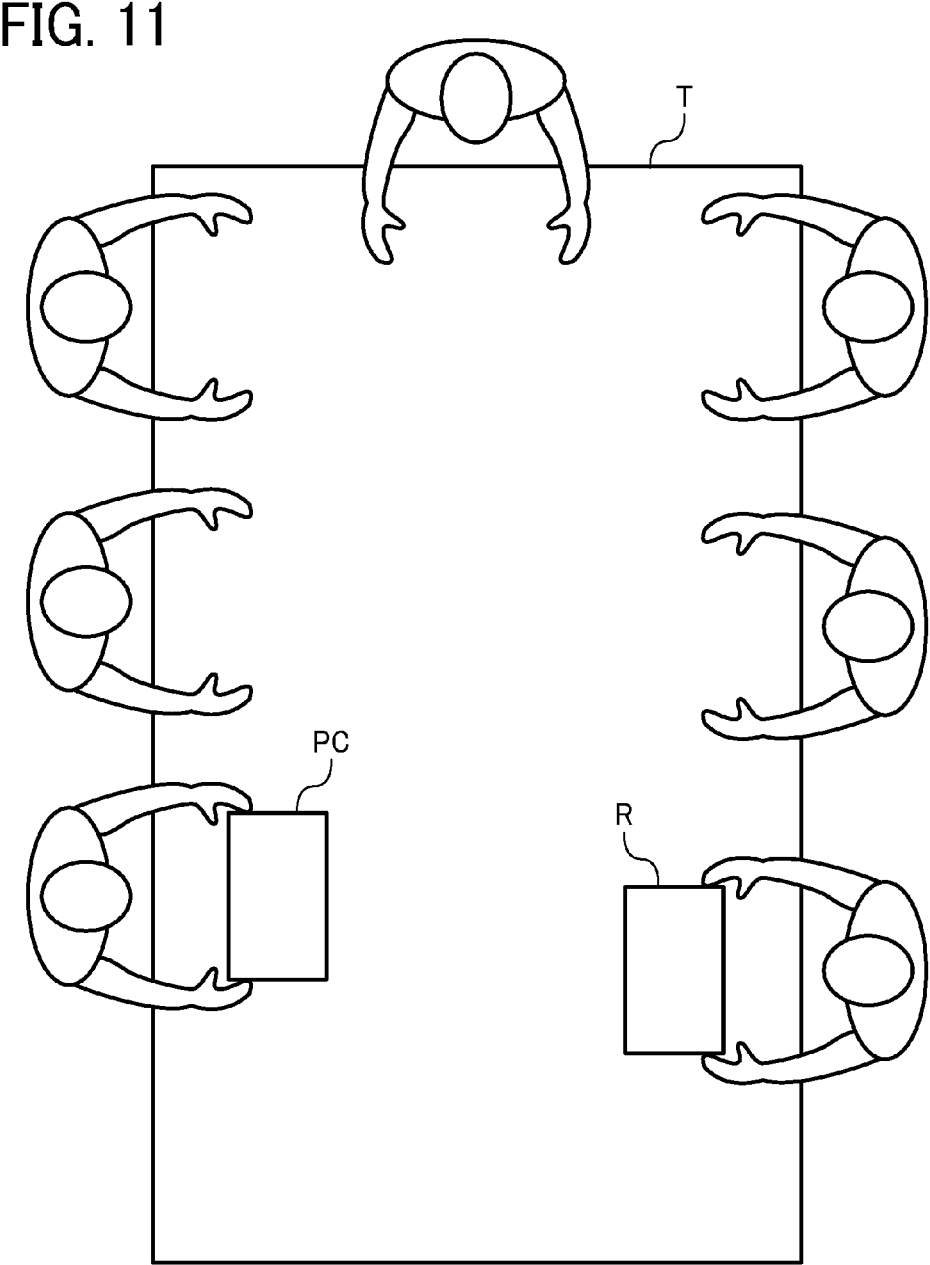
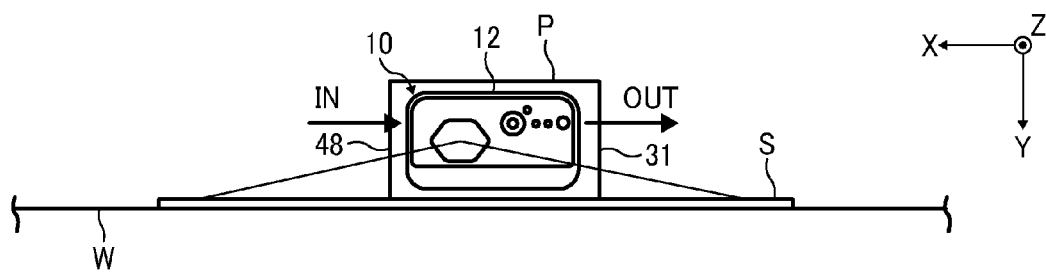

INSIDE OF HOUSING ← → OUTSIDE OF HOUSING

INSIDE OF HOUSING ← → OUTSIDE OF HOUSING

INSIDE OF HOUSING ← → OUTSIDE OF HOUSING

INSIDE OF HOUSING ← → OUTSIDE OF HOUSING

PROJECTOR

CROSS-REFERENCE TO RELATED APPLICATION

This application claims priority to Japanese Patent Application No. 2011-186743, filed on Aug. 30, 2011 in the Japan Patent Office, which is incorporated by reference herein in its entirety.

BACKGROUND

1. Technical Field

The present invention relates to a projector, and more particularly to a projector that projects light corresponding to image data via a light projection port disposed on a top face of a housing.

2. Description of the Background Art

Short-focus projector can project light corresponding image data from a light projection port, disposed on a top face of a housing, to a screen disposed at a upward oblique direction with respect to the housing (e.g., JP-2008-158495-A).

Such projector may be placed near the screen, and a space opposite to the screen with respect the projector can be used as a passageway.

Further, such projector typically has a housing having two opposing faces, in which the light projection port is disposed in one face and a plurality of connection ports for connecting cables of, for example, power supply, communication, image, and audio is disposed in the other face (e.g., JP-2003-215710-A).

When such projector is positioned for use, the one face with the light projection port faces the screen and the other face with the plurality of connection ports faces away from the screen.

However, if the plurality of connection ports is disposed on the other face of the housing of a short-focus projector, which is positioned opposite to the screen as indicated in JP-2003-215710-A, cables connected to the plurality of connection ports may droop from the housing into to the space, by which the cables might trip a person entering the space between the screen and the projector.

SUMMARY

In one aspect of the present invention, a projector is devised. The projector includes a housing, an image projection unit, and a plurality of connection ports including a power connection port. The housing has a top face, and a first face and a second face adjacent to each other, and a light projection port on the top face. The image projection unit includes an optical system to project light corresponding to image data, via the light projection port disposed on the top face, in an upward oblique direction with respect to the first face. The plurality of connection ports is disposed on the second face. The power connection port is disposed at a position in the second face closest to the first face side.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 11 shows an example of use environment of the projector;

Figure 1:
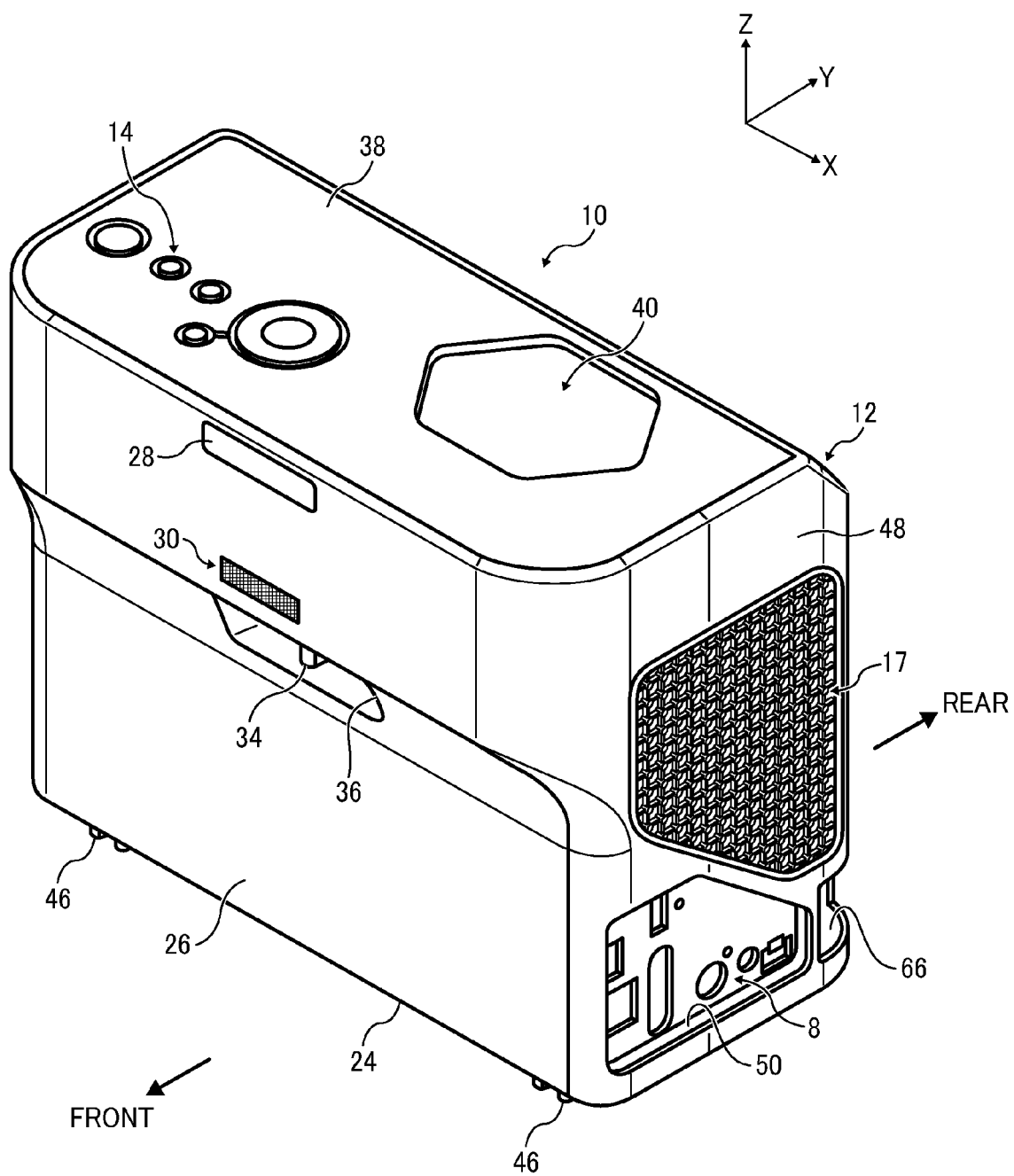
FIG. 1 shows a perspective view of a projector according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to an example embodiment is described hereinafter.

Figure 2:
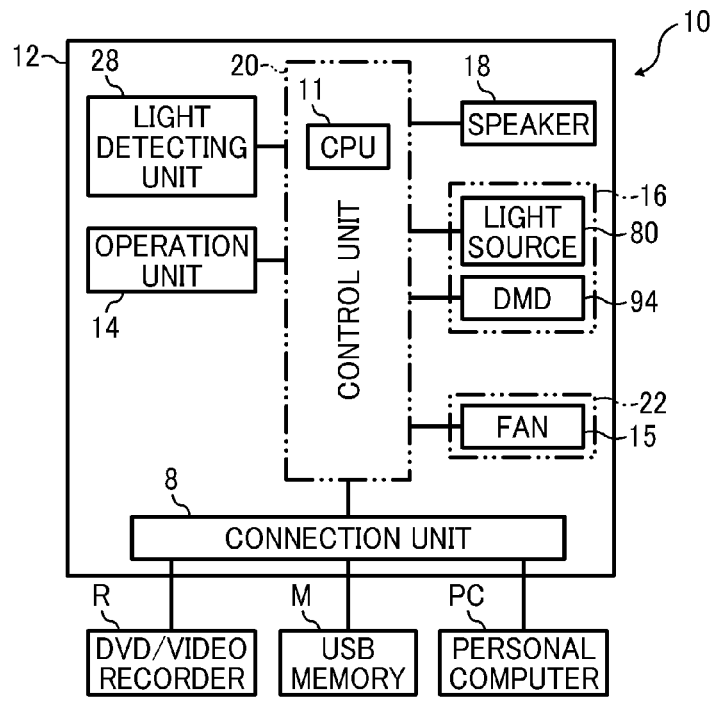
FIG. 2 shows a block diagram of an internal configuration of the projector and external devices connectable to the projector of FIG. 1.

A description is given of a projector or a projection system according to an example embodiment with reference to FIG. 1 to FIG. 14. FIG. 1 shows a perspective view of a projector 10 according to an example embodiment, wherein the projector 10 is an example of electronic devices. FIG. 2 shows a block diagram of the projector 10.

The projector 10 may be, for example, placed on a platform P disposed on a floor F parallel to a horizontal face (see FIG. 12), or placed on the floor.

For example, the projector 10 includes a housing 12, an optical projection unit 16, a light detecting unit 28, an operation unit 14, a cooling device 22, a speaker 18, a connection unit 8, and the control unit 20. Such units are connected to the control unit 20. The optical projection unit 16, encased in the housing 12, can project light beams generated based on information input from external devices such as a digital versatile disk (DVD)/video recorder R, a personal computer PC, or a universal serial bus (USB) memory M, onto a face of a screen S (see FIGS. 11 and 12). Such external devices can be connected to the connection unit 8 of the projector 10. Further, the projector 10 includes an adjustment unit to move a part of the optical projection unit 16 to change an image size projected on the screen S.

A description is given of the optical projection unit 16 and the cooling device 22 encased in the housing 12.

Figure 3:
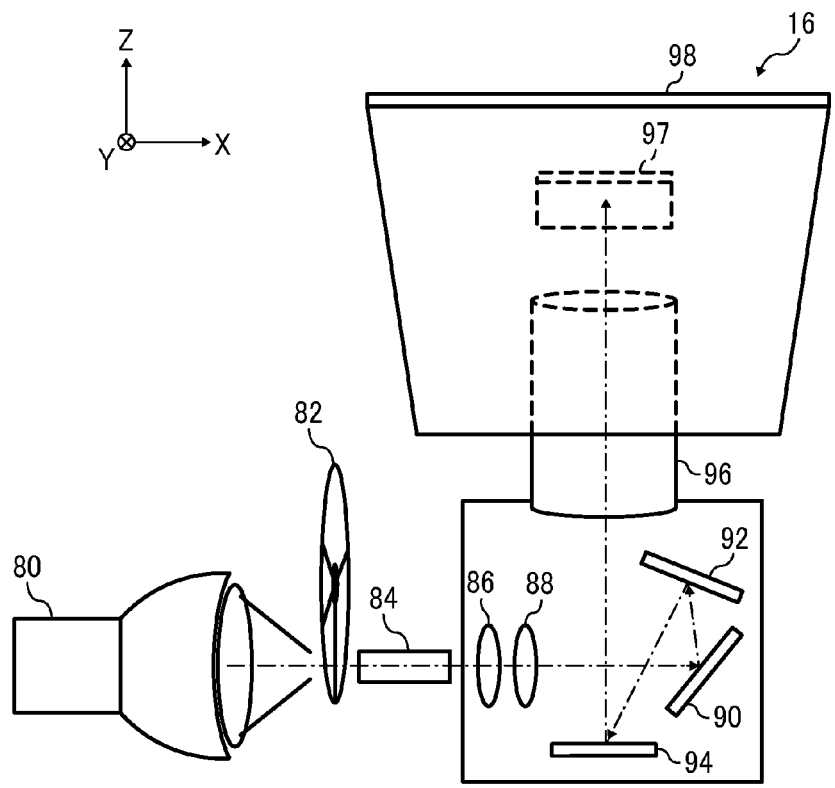
FIG. 3 shows a schematic configuration of an optical projection unit or system of the projector.

As shown in FIG. 3, the optical projection unit 16 includes, for example, a light source 80, a color wheel 82, a light tunnel 84, condenser lenses 86 and 88, mirrors 90 and 92, a digital micro mirror device (DMD) 94, a projection lens 96, a minor 97, and a free-form-surface minor 98, which are arranged from the light source 80 along a light path. The light source 80 emits light. The color wheel 82 is an example of light separator, in which the wheel is segmented into a plurality of areas to pass through corresponding color light beam. The light tunnel 84 is an example of light intensity unifying unit. The condenser lenses 86 and 88 are examples of light refraction member (or light focusing member). The mirrors 90 and 92 are examples of light reflector. The DMD 94 is an example of light modulator.

The projection lens 96 is an example of wide-angle projection and focusing unit. The mirror 97 is an example of light reflector. The free-form-surface mirror 98 is an example of wide-angle projection and reflection unit.

The projection lens 96 can be composed of a plurality of lens elements having an optical axis direction along the Z-axis direction, and arranged with a given interval along the optical axis direction. The DMD 94 can be controlled by the control unit 20 based on, for example, image data output from the personal computer PC, the DVD/video recorder R, or the like. In FIG. 3, the light path from the light source 80 to the mirror 97 is indicated by arrows.

Figure 12:
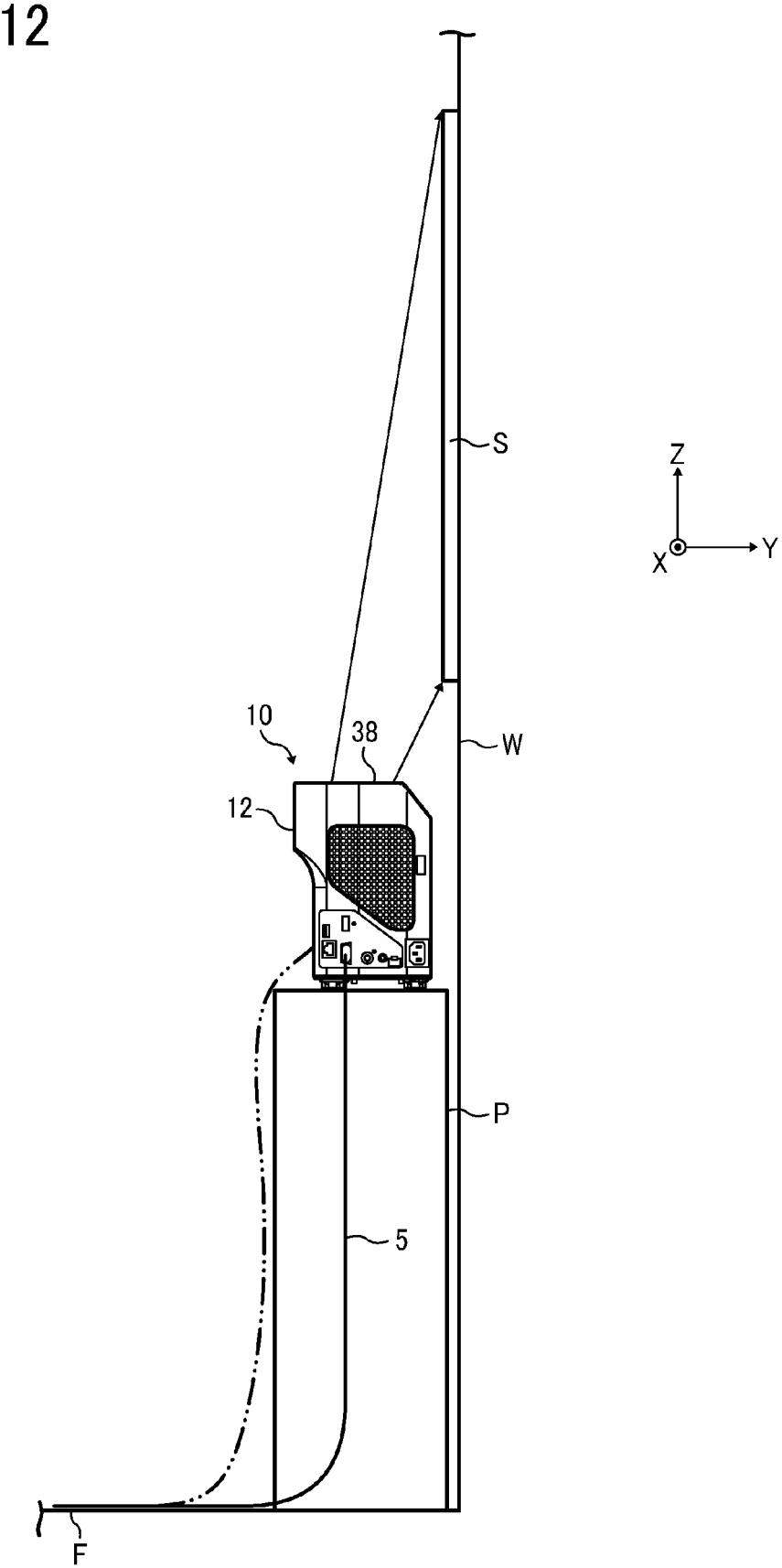
FIG. 12 shows another example of use environment of the projector.

In the optical projection unit 16, the light emitted from the light source 80 enters the color wheel 82. The light entered the color wheel 82 can be sequentially separated, and output as three primary colors of lights from the color wheel 82 as timewise manner. Each of the light output from the color wheel 82 enters the light tunnel 84 to set uniform distribution of light intensity, and then enters the condenser lenses 86 and 88 sequentially. Each of the primary color lights that enters the condenser lenses 86 and 88 receives a focus-face adjustment process, and reflected by the mirrors 90 and 92 sequentially, and then enters the DMD 94. Each of the primary color lights that enters the DMD 94 is modulated by the DMD 94 based on the image data, and reflected at the DMD 94, and then enters the projection lens 96 sequentially. Each of the primary color lights that enters the projection lens 96 receives an wide angle process, and reflected by the minor 97, and then enters the free-form-surface minor 98 sequentially. Each of the primary color lights that enters the free-form-surface minor 98 is reflected with a wide angle by the free-form-surface minor 98, and then projected to an upward direction of the housing 12 via a light projection port, to be described later. Specifically, the light is sequentially projected to an upward direction such as upward oblique direction from a rear face 42 of the housing 12, which is +Z and +Y direction from the housing 12 as shown in FIG. 12.

The optical projection unit 16 is configured to have a short focus so that the focus distance of the light projected from the projector 10 can be set shorter from the projector 10. The shorter projection distance enables a greater display or projection of a color image or a monochrome image on the screen S arranged, for example, at upward oblique direction of the housing 12 such as +Z and +Y direction near from the housing 12 as shown in FIG. 12.

The optical projection unit or system such as the optical projection unit 16 having a configuration of the short focus means that the optical projection unit 16 is an optical unit or system having a mirror such as the free-form-surface minor 98 having a given level of refractive index or an index of refraction. The refractive index may be positive and negative. Because the optical projection unit 16 includes the mirror having a given level of refractive index, a greater projection image can be displayed on the screen S even if the distance between a light projection port and the screen S is short. For example, if the distance between the light projection port and the screen S is within 50 cm, a projection image of about 80 inch can be displayed on the screen S. Further, the configuration of the optical projection unit 16 is not limited to the above described configuration, but can be changed as required.

The cooling device 22 is used to cool a heat generating element or source such as the light source 80 (see FIGS. 2 and 3), a central processing unit (CPU) 11 disposed on a substrate of the control unit 20 (see FIG. 2). Specifically, the cooling device 22 releases or ejects heat generated by the heat generating element or source to the outside the housing 12 to cool the heat generating element or source.

The cooling device 22 includes, for example, a heat releasing member such as a metal heat sink connected to a heat generating source such as the light source 80 and the CPU 11, a gas-flow guide member such as a duct, a gas-flow generator such as a fan 15 (see FIG. 2), and a gas-flow port such as a gas-intake port and a gas-ejection port, to be described later.

The duct includes a first portion and a second portion. One end (e.g., open end) of the first portion is positioned near the gas-intake port disposed on the housing 12, to be described later, and another end (e.g., open end) of the first portion is positioned near the heat sink connected to the light source 80 and the CPU 11. One end (e.g., open end) of the second portion is positioned near the gas-ejection port disposed on the housing 12, to be described later, and another end (e.g., open end) of the second portion is positioned near the light source 80 and the CPU 11. Further, a dust-proof filter may be disposed between the gas-intake port and the one end of the first portion, and a dust-proof filter is disposed between the gas-ejection port and the one end of the second portion.

The fan 15 may be disposed, for example, at a position of the second portion of the duct close to the gas-ejection port. The fan 15 may be, for example, a large fan. The fan 15 may be activated when the power supply to the electrical system of the projector 10 is set to ON. Further, the fan 15 can be positioned at any positions as long as the fan 15 can generate the gas flow in the duct effectively and efficiently such as a position next to the gas-intake port.

When the fan 15 is activated, gas such as air can be sent into the duct (or housing 12) via the gas-intake port, to be described later. The air flows along the duct, and sucks heat released from a heat generation device such as each heat sink of the light source 80 and the CPU 11, and then the air is ejected outside of the duct (or housing 12) via the gas-ejection port, to be described later. With such a configuration, the heat released from the heat generation device (i.e., each heat sink) can be ejected outside the housing 12, by which the heat generation device such as the light source 80 and the CPU 11 can be cooled effectively and efficiently.

As shown in FIG. 1, the housing 12 can be formed into, for example, a substantially rectangular parallelepiped shape. The housing 12 of the projector 10 is placed in a space defined by the X-axis, the Y-axis, and the Z-axis directions. In an example embodiment, the X-axis direction is a width direction of the housing 12 of the projector 10 which may be set parallel to the screen S when the projector 10 is placed on the top face of a platform, which is parallel to a horizontal face; the Y-axis a depth direction of the housing 12 of the projector 10, which is perpendicular to the X-axis in a horizontal face; and the Z-axis is a height direction of the housing 12 of the projector 10, which is perpendicular to the X-axis and the Y-axis.

FIGS. 4 to 8 show a front view, a top view, a right side view, a left side view, and a bottom view of the projector 10. The front view is viewed from the −Y direction (FIG. 4); the top view is viewed from the +Z direction; the right side view is viewed from the +X direction; the left side view is viewed from the −X direction, and the bottom view is viewed from the −Z direction. A description is given of each parts observable on the projector 10 with reference to FIGS. 4 to 8.

The housing 12 may have a substantially rectangular parallelepiped shape such as a box having an internal hollow space. The housing 12 may be made of materials, relatively light weight and strong robust such as for example, rigid resin, rigid plastics, hard resin such as plastic. The housing 12 may be colored in, for example, white except a top face 38.

Figure 6:
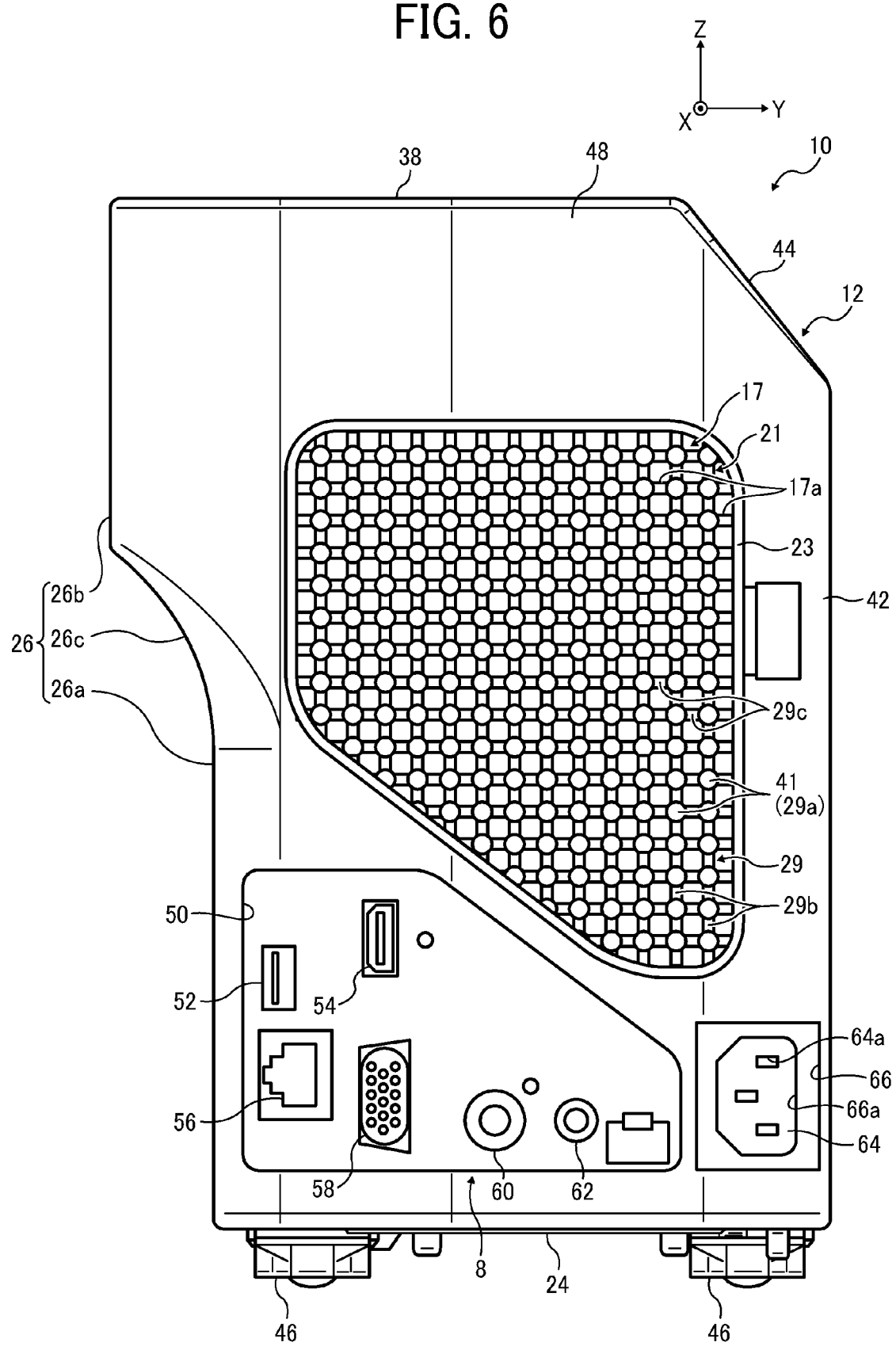
FIG. 6 shows a right side view of the projector.
Figure 7:
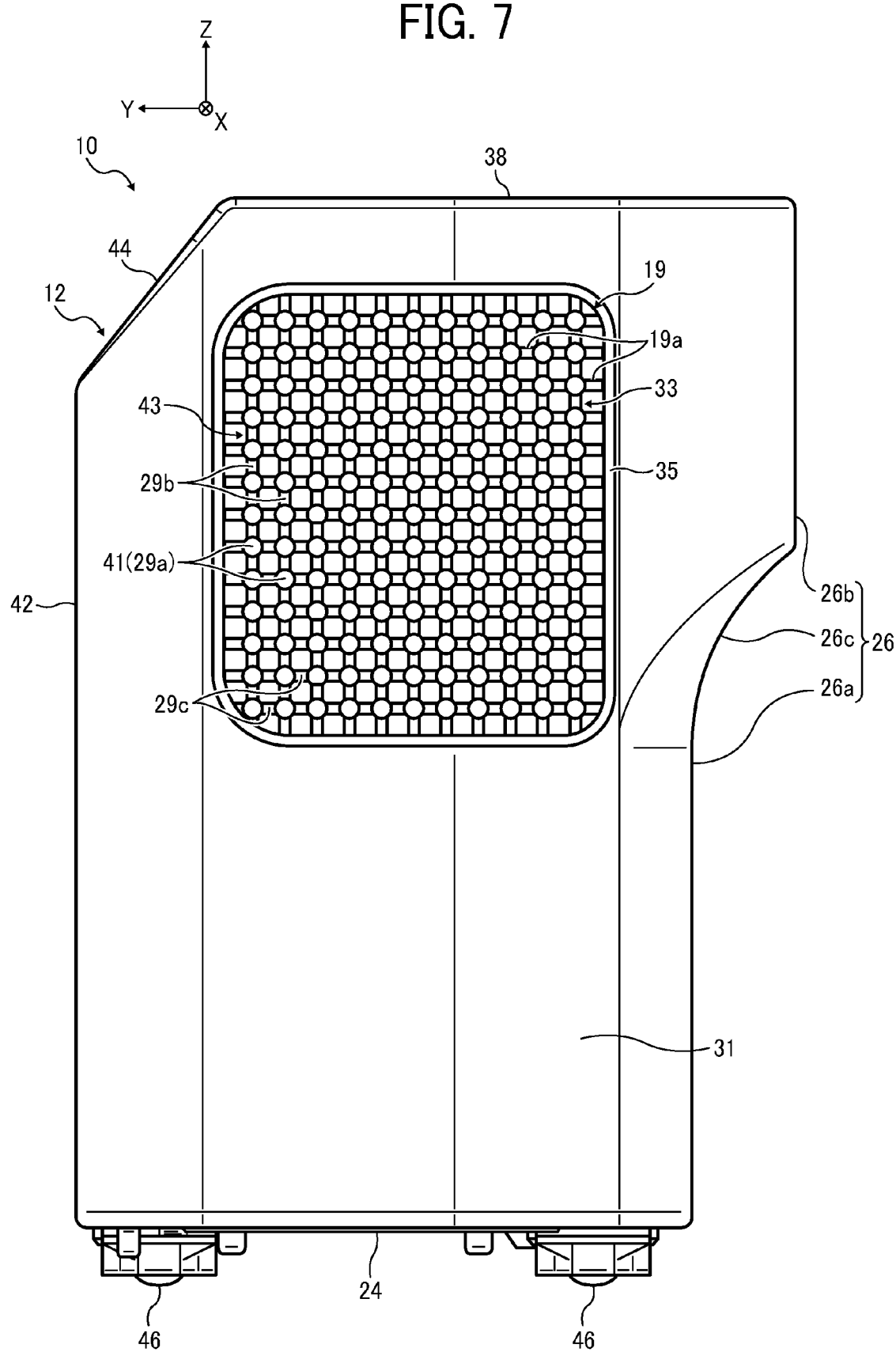
FIG. 7 shows a left side view of the projector.

As shown in the housing 12 of FIGS. 6 and 7, the length of the Y-axis direction of the base 24 is set smaller than the height of the front face 26, which is the −Y side face of the housing 12, and the height of the rear face 42, which is the +Y side face of the housing 12. As such, the area of the front face 26 and the rear face 42 are set greater than the area of the base 24. Such projector 10 can be referred to as a vertically-oriented projector.

For example, the base 24 of the housing 12 has a given depth (i.e., length in the Y-axis direction) such as from 5 cm to 8 cm. Then, the height (i.e., length in Z-axis direction) of the housing 12 is set, for example, to two times of the length in the Y-axis direction of the base 24 (e.g., 10 cm to 16 cm), and the width (i.e., length in X-axis direction) of the housing 12, is set, for example, to three times of the length in the Y-axis direction of the base 24 (e.g., 15 cm to 24 cm). As such, the projector 10 can be configured as a compact and vertically-oriented projector.

As shown in FIGS. 6 and 7, the front face 26 of the housing 12 may include three parts such as a lower part 26a, an upper part 26b, and a the middle part 26c. The lower part 26a is extended in parallel to the X-Z plane. The upper part 26b is extended in parallel to the X-Z plane, and position at the +Z side and −Y side with respect to the lower part 26a. The middle part 26c connects the lower part 26a and the upper part 26b with a smooth curved face. The middle part 26c may be formed as a curved portion, and thereby the middle part 26c may be also referred to as a curved portion 26c, as required. When a user holds the projector 10 by his both hands, the housing 12 can be held securely by holding the curved portion 26c by his both hands.

Figure 4:
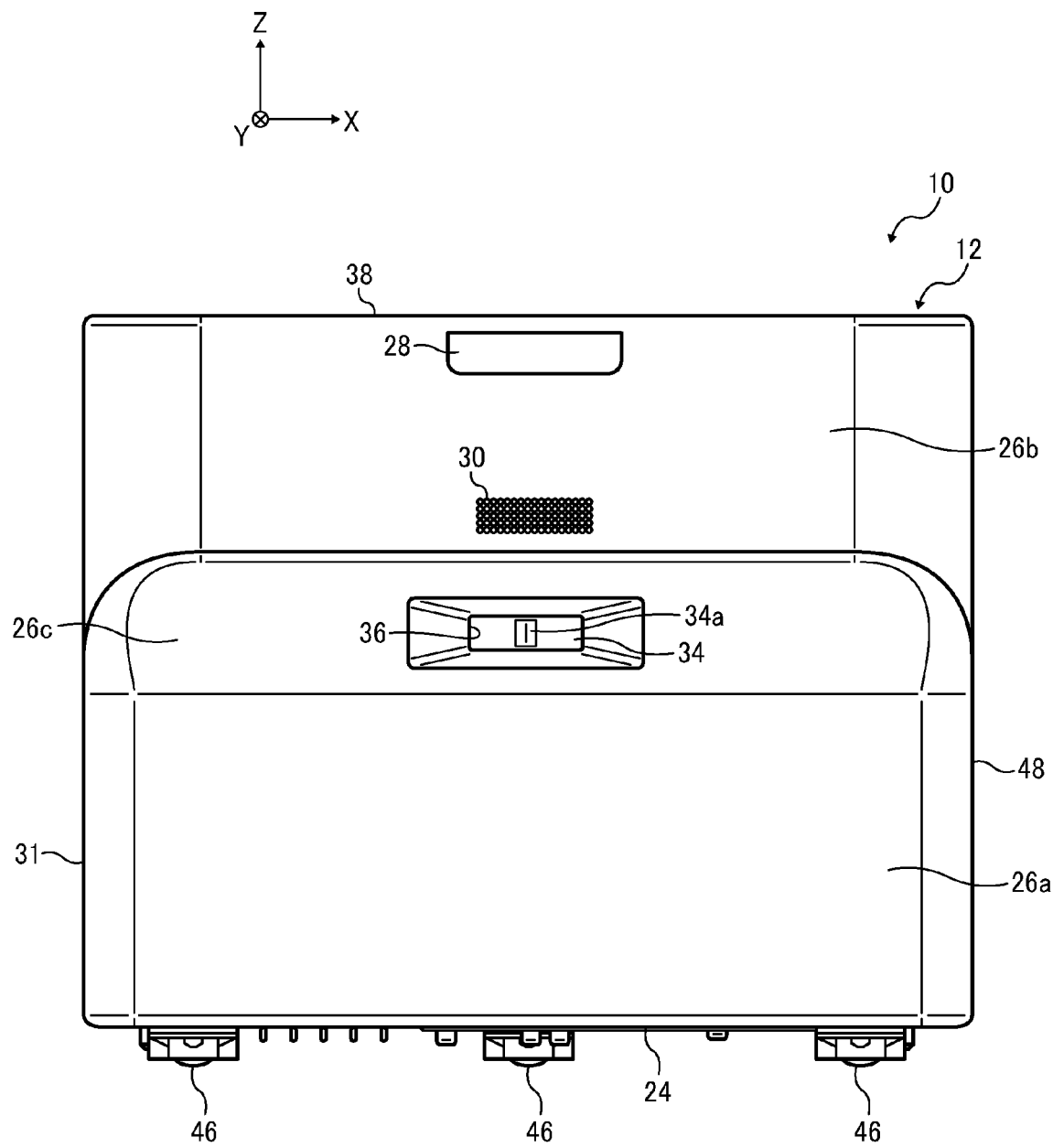
FIG. 4 shows a front view of the projector.

As shown in FIG. 4, the light detecting unit 28 may be disposed at a top center of the upper part 26b of the front face 26 of the housing 12. The light detecting unit 28 includes a light sensor at its center to receive optical signals coming from a remote controller, and a light emitting diode (LED) is disposed near the light sensor. The LED can change the color of emitting light and/or the emitting timing depending on the status of the projector 10 such as normal operation and abnormal operation. The abnormal operation of the projector 10 may mean, for example, an abnormal operation of the fan 15, the CPU 11, or the light source 80, to be described later.

Upon receiving optical signals from the remote controller, the light sensor converts the optical signals to electronic/electrical signals, and outputs the electronic/electrical signals to the control unit 20. The control unit 20 controls various operations based on instructions corresponding to the electronic/electrical signals. Because the light sensor is disposed at the center of the light detecting unit 28, the light sensor can effectively receive light coming from the remote controller. Further, the status of the projector 10 can be notified to a user by light emitting timing of the LED, and/or the light color of the LED. Further, for example, the remote controller and the operation unit 14 have the same function such as instructing the control unit 20 to conduct given operations. The detail of function of the operation unit 14 will be described later.

Further, as shown in FIG. 4, an audio releasing port 30 is disposed at the lower center of the upper part 26b of the front face 26 of the housing 12, which is lower than the light detecting unit 28. The audio releasing port 30 includes a plurality of through-holes to release audio/sound output from the speaker 18 (see FIG. 2). The plurality of through-holes composing the audio releasing port 30 is disposed two-dimensionally with a given interval with each other while arranging the through-holes with two-dimensional polygon area such as a rectangular area, a circle area, and an ellipse area. The size, number, and density of through-holes of the audio releasing port 30 can be changed depending the desired performance level of the speaker 18. The speaker 18 will be described later.

Further, as shown in FIG. 4, a window 36 is disposed at the center of the X-axis direction of the middle part 26c of the front face 26 of the housing 12, which may be below the audio releasing port 30, wherein a focus adjustment lever 34 having a knob 34a is set in the window 36. The focus adjustment lever 34 may be simply referred to as a lever, hereinafter. The focus adjustment lever 34 is operated to adjust the focus point of the projection lens 96 (see FIG. 3). The knob 34a of the focus adjustment lever 34 and the window 36 may be disposed at the curved portion 26c of the front face 26 of the housing 12, and may not be so visible.

As shown in FIG. 4, the window 36 may have a rectangular shape in the X-axis direction, and may be formed in a tapered shape in the Y-axis direction, in which the −Y side of the window 36 has a greater length compared to the +Y side of the window 36.

The focus adjustment lever 34 may be slide-able in the X-axis direction (or pivotable about the Z-axis), and is mechanically coupled to the projection lens 96 (see FIG. 3) via a drive-force transmission mechanism such as a gear. Upon sliding the focus adjustment lever 34, the drive-force transmission mechanism moves a part of the lens elements configuring the projection lens 96 along the optical axis direction. With such movement, the focus point of the projection lens 96 can be adjusted. Specifically, when the focus adjustment lever 34 is activated into one side of the X-axis direction (or one direction about the Z-axis), the image focus point of light projected via the projection lens 96 is set at far. In contrast, when the focus adjustment lever 34 is activated into another side of the X-axis direction (or another direction about the Z-axis), the image focus point of light projected via the projection lens 96 is set at near.

The knob 34a of the focus adjustment lever 34 is inserted into the window 36 from the inner side of the housing 12, and the knob 34a is designed to have a size so that an edge of the knob 34a does not protrude from the face of the middle part 26c of the front face 26 of the housing 12. With such a configuration, the focus adjustment lever 34 does not protrude from the face of the housing 12, by which an unintended operation of the focus adjustment lever 34 can be prevented, and further, the focus adjustment lever 34 may not become an obstacle when to carry the projector 10.

As shown in FIGS. 4, 6, and 7, the top face 38 of the housing 12 may be a substantially flat plate, parallel to the X-Y plane, and the top face 38 is connected to the upper part 26b of the front face 26 of the housing 12. For example, the top face 38 of the housing 12 may be colored with a given color such as black, and the rest of the housing 12 may be colored with a given color such as white. With such coloring, the appearance of the projector 10 has an effective contrast as a whole.

Figure 5:
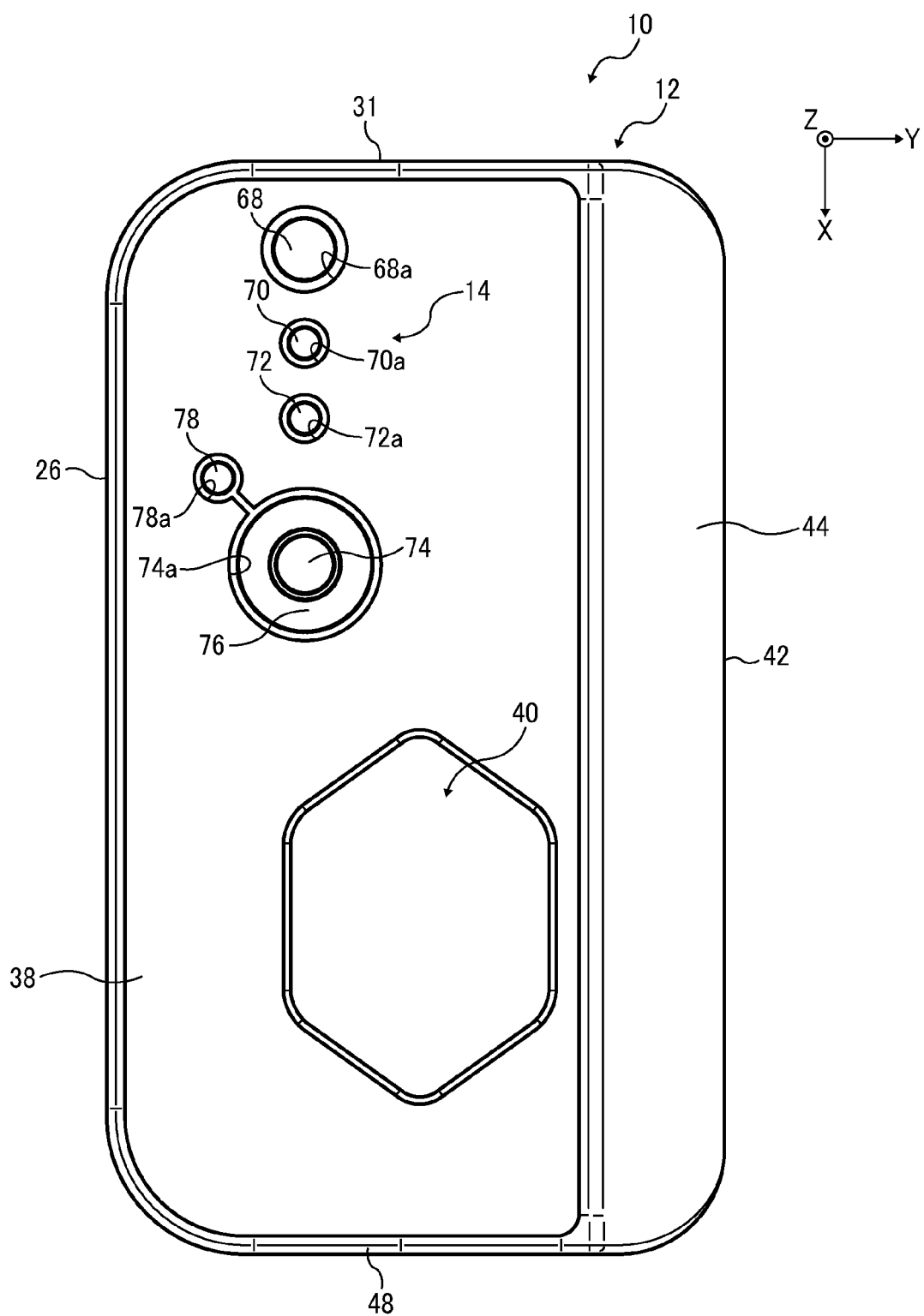
FIG. 5 shows a top view of the projector.

As shown in FIG. 5, a light projection port 40 and the operation unit 14 may be disposed on the top face 38 of the housing 12. The light projection port 40 may be formed as an opening having a two-dimensional polygon shape (e.g., hexagonal shape) at a portion of the top face 38 such as +X/+Y position on the top face 38. The light projection port 40 may be covered by a transparent cover or a semi-transparent cover. As described later, the light coming from the optical projection unit 16 is projected outside the housing 12 via the cover, which covers the light projection port 40. Hereinafter, the light projection port 40 may mean a light projection port covered by the cover.

As shown in FIG. 5, the operation unit 14 may include a plurality of controls (e.g., 6) disposed on the top face 38 of the housing 12, which may be the −X area with respect to the light projection port 40. The plurality of controls may be, for example, press-type controls such as pushbuttons.

Specifically, a power button 68, an input button 70, a mute button 72, and an enter button 74 may be sequentially disposed on the top face 38 of the housing 12 in a direction from the −X side to +X side. The input button 70 can be used as an input switching button.

The power button 68 is used as a control to switch power-ON/OFF for electrical parts in the projector 10. The power button 68 may have a press portion having a circular shape, and the press portion is inserted in a circular opening 68a, formed on the top face 38 of the housing 12 and greater than the diameter of the press portion. The press portion is co-axially inserted and moveable in the upward/downward direction in the circular opening 68a. The power button 68 may be biased into an upward direction by a spring. When the power button 68 is pressed down against an upward-biasing force of the spring, the power-ON/OFF for the electrical parts can be switched. Further, the power-ON condition can be set by pressing and maintaining the pressed position of the power button 68. Further, the power-ON/OFF condition can be switched whenever the power button 68 is pressed.

Further, the power button 68 may be disposed with a lighting member such as for example a blue light emitting diode (LED). The blue LED can be set to emit a light when the power-ON condition is set, by which the position of the power button 68 can be recognized even the projector 10 is used in a dark environment.

The input button 70 is used as a control to switch a data input source such as external devices or memories connected to the projector 10. The external devices and memories may be also referred to as connectable devices. The input button 70 may have a press portion having a circular shape, and the press portion is inserted in a circular opening 70a, formed on the top face 38 of the housing 12 and greater than the diameter of the press portion. The press portion is co-axially inserted and moveable in the upward/downward direction in the circular opening 70a. The input button 70 may be biased into an upward direction by a spring. When the input button 70 is pressed down against an upward-biasing force of the spring, the data input source to the projector 10 can be switched from one connectable device to another connectable device that outputs image signals.

The mute button 72 is used as a control to mute the light projected from the optical projection unit 16, and audio/sound output from the speaker 18. The mute button 72 may have a press portion having a having a circular shape, and the press portion is inserted in a circular opening 72a, formed on the top face 38 of the housing 12 and greater than the diameter of the press portion. The press portion is co-axially inserted and moveable in the upward/downward direction in the circular opening 72a. The mute button 72 may be biased into an upward direction by a spring. When the mute button 72 is pressed down against an upward-biasing force of the spring while the optical projection unit 16 is projecting the light, and/or the speaker 18 outputs the audio/sound, the light projection from the optical projection unit 16 is stopped, and/or the audio/sound output from the speaker 18 is stopped. When the mute button 72 is pressed again, the mute is canceled, by which the light projection from the optical projection unit 16 is resumed, and/or the audio/sound output from the speaker 18 is resumed.

The enter button 74 is used as a control to determine items selected on a menu screen projected on the screen S. Specifically, when a menu button 78 is operated, a menu screen is projected and displayed on the screen S (see FIGS. 11 and 12). In such menu screen, a cursor 76, to be described later, is operated to select an item, wherein the cursor 76 is used to point one of menu items, and then the enter button 74 is pressed to enter the selected item. The enter button 74 may have a press portion having a having a circular shape, and the press portion is inserted in a circular opening 74a, formed on the top face 38 of the housing 12 and greater than the diameter of the press portion. The press portion is co-axially inserted and moveable in the upward/downward direction in the circular opening 74a. The enter button 74 may be biased into an upward direction by a spring. When the enter button 74 is pressed down against an upward-biasing force of the spring under a condition that one item is pointed and selected in the menu screen, the menu screen displays the detail of the selected item.

As shown in FIG. 5, on the top face 38 of the housing 12, the cursor 76 is disposed along the outer periphery of the enter button 74, and the cursor 76 is disposed in the circular opening 74a. The cursor 76 is used as a control to select items in the menu screen projected on the screen S. The cursor 76 may have a press portion having a ring shape, and the press portion is inserted between the enter button 74 and the circular opening 74a. Such press portion can be slantingly pressed into the downward in the X and Y-axis directions.

The cursor 76 may be biased into an upward direction by a spring. When the cursor 76 is pressed down against an upward-biasing force of the spring at any one of +X, −X, −Y, and +Y ends of the cursor 76, a direction indicator displayed on the menu screen, moves to a direction corresponded to the cursor-selected direction such as +X, −X, −Y, or +Y direction.

The items of to-be-selected and entered using the menu screen may be, for example, an image adjustment mode and setting mode. Further, when the cursor 76 is pressed down to the +X and −X ends, the volume of audio/sound output from the speaker 18 may be adjusted.

The menu button 78 may be disposed near the cursor 76 on the top face 38 of the housing 12 such as the −X and −Y side with respect to the cursor 76. Specifically, when the menu button 78 is operated, a menu screen is projected and displayed on the screen S (see FIGS. 11 and 12). The menu button 78 may have a press portion having a circular shape, and the press portion is inserted in a circular opening 78a, formed on the top face 38 of the housing 12 and greater than the diameter of the press portion. The press portion is coaxially inserted and moveable in the upward/downward direction in the circular opening 78a. The menu button 78 may be biased into an upward direction by a spring. When the menu button 78 is pressed down against an upward-biasing force of the spring, the display or non-display of the menu screen can be switched.

When each one of the above described controls is pressed, a corresponding operation terminal installed on a circuit board of the control unit 20 is pressed because the corresponding operation terminal is placed right under the corresponding control. Then, the control unit 20 receives instruction signals specifically set for each one of the controls, and the control unit 20 conducts the instructed functions. When each of the controls is not in the pressed condition, the top face of the controls may be set higher than the top face 38 of the housing 12 with some length.

Each of the controls may be colored with the same color of the top face 38 of the housing 12 (e.g., black), by which appearance of the controls can be assimilated into the top face 38. As shown in FIG. 5, at each of the controls, a ring-like space can be set between the press portion and its surrounding circular opening inserted with the press portion, by which a user can recognize the positions of each one of the controls easily. Further, as shown in FIG. 5, the cursor 76 and the menu button 78 having a close functional relationship can be linked with each other by forming a groove between the cursor 76 and the menu button 78 on the top face 38, by which a user can recognize the positional relationship between the cursor 76 and the menu button 78 easily.

Further, the above described remote controller may have pushbuttons having the same function (i.e., operation contents) of the controls of the operation unit 14.

As shown in FIGS. 6 and 7, a sloped portion 44 may be disposed at the upper end of the rear face 42 of the housing 12. The mirror 97 (see FIG. 3), used as a part configuring the optical projection unit 16, is disposed in an inner side of the sloped portion 44 of the housing 12.

As shown in FIG. 6, a gas-intake port 17 is disposed at the center portion of a right side face 48, which is the +X side face or wall of the housing 12. The gas-intake port 17 includes a plurality of through-holes 17a used as a gas-flow port.

As shown in FIG. 6, the gas-intake port 17 can be defined by a frame 23 formed on the right side face 48 of the housing 12. The frame 23 may have a pentagonal opening shape. The plurality of through-holes 17a of the gas-intake port 17 can be formed by the frame 23, and a lattice structure 21 arranged in the frame 23.

When viewed from the +X direction, for example, the frame 23 has a substantially pentagonal shape, and the frame 23 is connected to the lattice structure 21 at a plurality of outer peripheral portions of the lattice structure 21. A pentagonal area encircled by the frame 23 may be set to a given value such as about one third (⅓) of the entire area of the right side face 48 of the housing 12. Further, the frame 23 may be protruded a little in the +X direction with respect to the surface of the right side face 48 of the housing 12.

Figure 9:
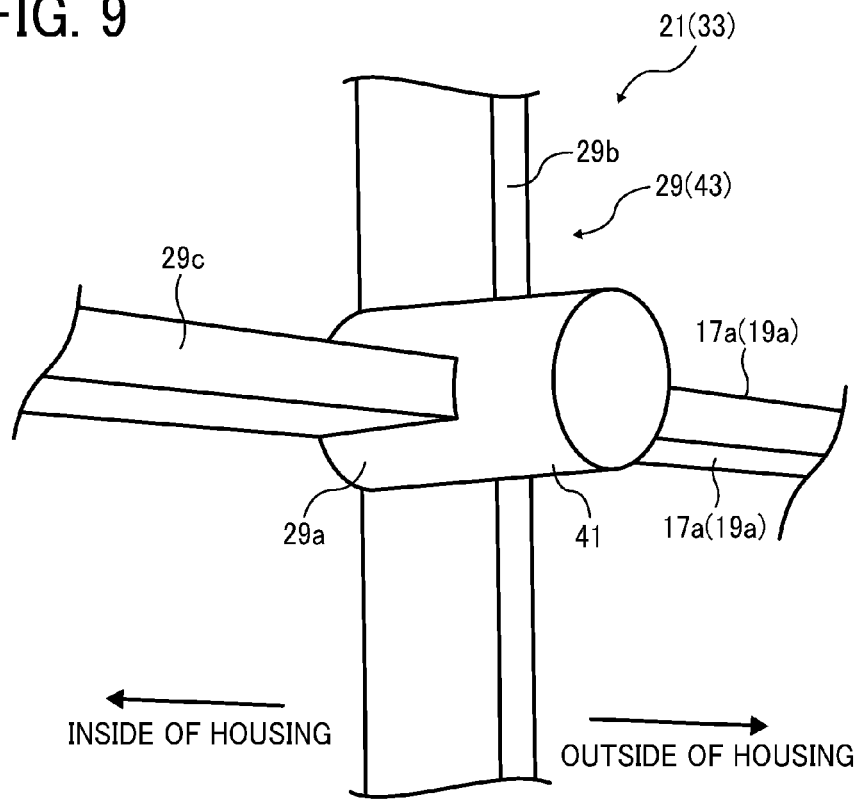
FIG. 9 shows a partial perspective view of a lattice structure formed in a housing of the projector.
Figure 10:
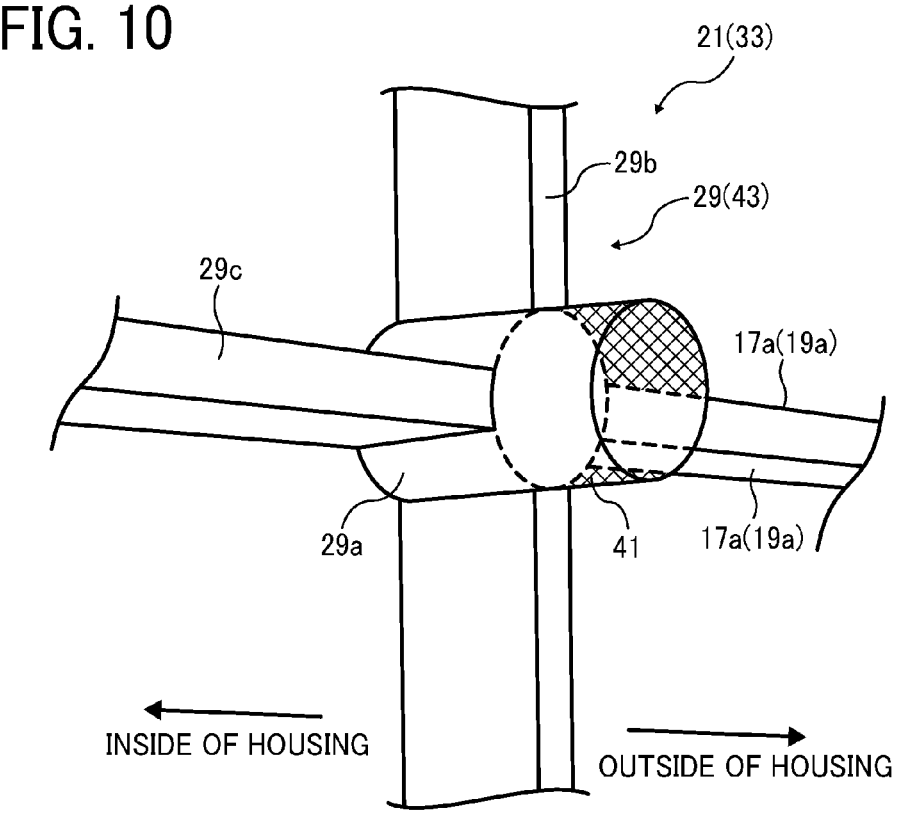
FIG. 10 shows a protruded member of the lattice structure which can function as a concealing member.

As shown in FIGS. 6 and 9, the lattice structure 21 includes a plurality of vertical lattice members 29b, a plurality of horizontal lattice members 29c, and a plurality of column members 29a. The plurality of vertical lattice members 29b is arranged with a given interval along the Z-axis direction (or parallel to the X-Z plane). The plurality of horizontal lattice members 29c is arranged with a given interval along the Y-axis direction (or parallel to the X-Y plane). The vertical lattice member 29b and the horizontal lattice member 29c may be collectively referred to as a main lattice 29 of a two-dimensional lattice having an even thickness in the X-axis direction. The column member 29a is disposed at each crossing point of the vertical lattice member 29b and the horizontal lattice member 29c forming the main lattice 29.

When viewed from the +X direction in FIG. 6, the column members 29a are arranged in a matrix, and, for example, 169 column members 29a are disposed. As shown in FIG. 9, the +X side end of the column member 29a has a protruded portion 41, which protrudes from the main lattice 29 into the +X side. The protruded portion 41, protruded from the main lattice 29 into the +X side, has a cross-sectional circular area greater than a square area at the crossing of the vertical lattice member 29b and the horizontal lattice member 29c. The protruded portion 41 may be also referred to as a protruded column 41.

Figure 14:
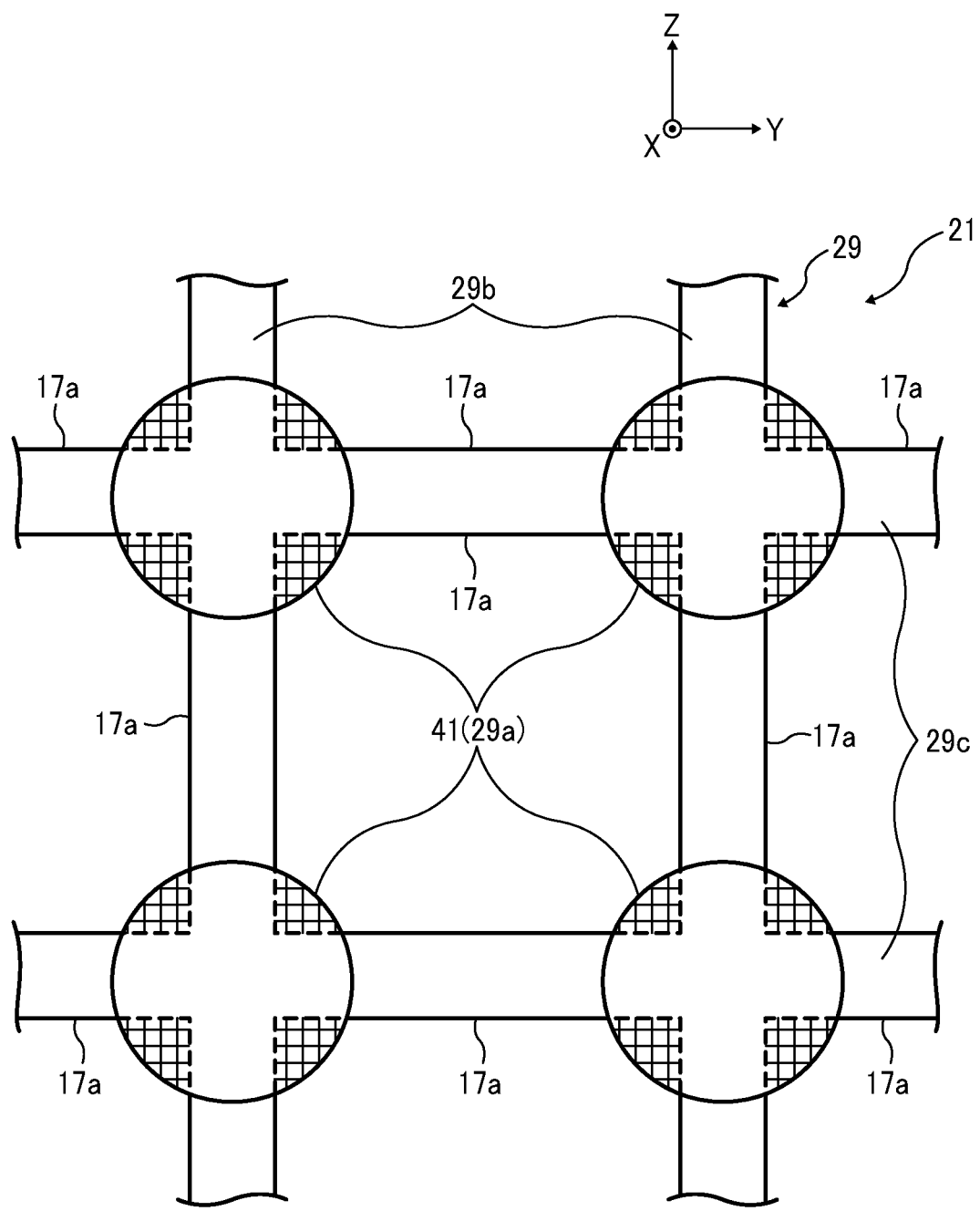
FIG. 14 shows a partial side view of the lattice structure.

Further, FIG. 14 shows the cross-sectional shape of the column member 29a with the vertical lattice members 29b and the horizontal lattice members 29c, in which the protruded portion 41 is cut on the Y-Z plane. As shown in FIG. 14, the column member 29a (see cross-hatched portion of FIG. 14) can be formed on the vertical lattice members 29b and the horizontal lattice members 29c along the X-direction. The column member 29a (i.e., cross-hatched portion) occupies a part of corner of the through-hole 17a defined by the vertical lattice members 29b and the horizontal lattice members 29c.

In an example embodiment, the main lattice 29 and the column member 29a are formed integrally to form the lattice structure 21. However, the main lattice 29 and the column member 29a can be formed separately, and then the column member 29a can be assembled to the main lattice 29. In both cases, the strength such as rigidity of the lattice structure 21 can be enhanced compared to a lattice structure having no column members 29a. Therefore, when the strength such as rigidity of the lattice structure 21 is set with the same level of strength of the conventional lattice structure having no column members 29a, the thickness of the main lattice 29 can be set thinner in the X-axis direction, which means the length in the X-axis direction can be set shorter.

Because the gas-intake direction (or gas-flow direction) of the gas-intake port 17, to be described later, is set along the X-axis direction, the pressure loss of the lattice structure 21 caused by the gas-intake can be reduced compared to a conventional lattice structure having the same opening area and the same strength. The pressure loss means the reduction of pressure of fluid caused by frictional resistance between fluid and a solid object.

Further, when viewed form the +X side, each of the column members 29a can be used as a concealing member, which can prevent to see parts disposed inside the housing 12 via the through-holes 17. The greater the diameter of the column member 29a, the greater the concealing effect of the concealing member. However, the greater the diameter of the column member 29a, the greater the pressure loss, by which a too-great diameter of the column member 29a is not preferable.

The lattice pitch of the main lattice 29, which is a distance between the shaft axises of the adjacent two column members 29a in the Y-axis and the Z-axis directions, may be set the same for the Y-axis and the Z-axis directions with a given pitch of, for example, 6 mm or so.

The +X side end of the protruded column 41 may be positioned with respect to the frame 23 as follows. Specifically, the +X side end of the protruded column 41 may be positioned at flush with the +X side end of the frame 23, or is positioned lower than the +X side end of the frame 23, which means the +X side end of the protruded column 41 is at a submerged position with respect to the +X side end of the frame 23 (i.e., inward direction to the housing 12). The diameter of the protruded column 41 or column member 29a is set greater than the thickness of the main lattice 29.

When the housing 12 is viewed from a perspective direction (see FIG. 1) such as from the +X side oblique direction (e.g., +X and −Y oblique direction, +X and +Y oblique direction, +X and +Z oblique direction, +X and −Z oblique direction), an inside view that can be seen via the through-hole 17a of the gas-intake port 17 may be blocked by the protruded column 41 disposed around the through-holes 17a (e.g., cross-hatched portion in FIG. 10), which means the protruded column 41 can function as a concealing member to prevent to see parts inside the housing 12 via the through-holes 17a.

When the housing 12 is viewed from the +X side oblique direction, the shorter the length of the main lattice 29 in the X-axis direction (i.e., length along the through-holes 17a), or the greater the lattice pitch of the main lattice 29, the inside area of the housing 12 that can be seen via the through-hole 17a becomes greater.

Therefore, to effectively function the protruded column 41 as the concealing member, the height and diameter of the protruded column 41 is required to set to a value, matched to the length of the main lattice 29 in the X-axis direction, and the lattice pitch of the main lattice 29. Specifically, the shorter the length of the main lattice 29 in the X-axis direction, or the greater the lattice pitch of the main lattice 29, it is preferable to set at least one of the height of the protruded column 41 (i.e., length in the X-axis direction), and the diameter of the protruded column 41 with a greater value.

However, the greater the diameter of protruded column 41 (or column member 29a), the smaller the opening area of the gas-intake port 17 (see FIG. 14).

When the fan 15 is activated and is rotated at a given speed, the greater the opening area of the gas-intake port 17, the slower the inflow speed of the gas such as air into the housing 12 via the gas-intake port 17. Therefore, the greater the opening area of the gas-intake port 17, the gas-intake sound such as wind noise at the gas-intake port 17 can be reduced. The opening area of the gas-intake port 17 can be computed by subtracting the Y-Z plane cross-sectional area of each of the protruded columns 41 (and column members 29a) and the Y-Z plane cross-sectional area of the main lattice 29 from the pentagonal area defined by the frame 23.

In an example embodiment, to set the pressure loss as low as possible, to set the opening area of the gas-intake port 17 as great as possible, and to have an effective concealing effect, the height of the protruded column 41 is set, for example, about from one third (⅓) to two thirds (⅔) (i.e., 2 mm to 4 mm or so) of the thickness of the main lattice 29 (i.e., length in the X-axis direction), and the diameter of the protruded column 41 is set, for example, about from one third (⅓) to two thirds (⅔) (i.e., 2 mm to 4 mm or so) of the lattice pitch of the main lattice 29.

Further, the Y-Z plane cross-sectional area of the vertical lattice member 29b and the horizontal lattice member 29c is set to a value to secure the opening area of the gas-intake port 17 as great as possible, and to secure an effective rigidity. As above described, the pentagonal area (or opening area) of the gas-intake port 17 defined by the frame 23 is set great such as for example one third (⅓) of the entire area of the right side face 48, which is the +X side face of the housing 12. Therefore, the opening area of the gas-intake port 17 becomes relatively great with respect the volume of the housing 12.

A description is given of the connection unit 8 with reference to drawings. As shown in FIG. 6, the connection unit 8 is disposed at a position lower than the gas-intake port 17 formed on the right side face 48 of the housing 12. Te connection unit 8 includes a plurality of connection ports (e.g., seven). Each of the plurality of connection ports is used as a connection terminal to be connected to an external device, an external memory, and an external power source, which may be connected to the control unit 20 (see FIG. 2).

As shown in FIG. 1, a concave portion 50 is formed at the lower part of the right side face 48 of the housing 12, which is relatively at the −Y side the right side face 48 as shown in FIGS. 1 and 6. In FIG. 6, six out of seven connection ports may be disposed at the concave portion 50 having a polygon shape (e.g., pentagon shape) when viewed from the +X side (see FIG. 6), and the six connection ports are arranged in two stages such as an upper stage and a lower stage. Further, the shape of the concave portion 50 may not be limited to the polygon shape, but a circle shape and an ellipse shape can be used.

At the upper stage of the concave portion 50, a USB terminal 52 and a high definition multimedia interface (HDMI) terminal 54 are arranged from the −Y side to the +Y side. The USB terminal 52 is connectable to external devices and memories such as the USB memory M, and the HDMI terminal 54 is connectable to an audio/visual (AV) device. Each of the USB terminal 52 and the HDMI terminal 54 can be inserted from the inner side of the housing 12 through a hole, formed on the bottom face of the concave portion 50.

At the lower stage of the concave portion 50, a local area network (LAN) terminal 56 used for communication, a computer terminal 58, a video input terminal 60, and an audio input terminal 62 are arranged from the −Y side to the +Y side. The computer terminal 58 is connectable to the personal computer PC to input red/green/blue (RGB) signals or the video device such as DVD/video recorder R to input component image signals. The video input terminal 60 is connectable to the video device to input image signals. The audio input terminal 62 is connectable to the personal computer PC and the video device to input audio/sound signals.

The LAN terminal 56 is inserted from the inner side of the housing 12 through a hole formed on the bottom face of the concave portion 50. Further, each of the computer terminal 58, the video input terminal 60, and the audio input terminal 62 is inserted from the inner side of the housing 12 through a hole formed on the bottom face of the concave portion 50. As shown in FIG. 1, the +X side end of each of the computer terminal 58, the video input terminal 60, and the audio input terminal 62 are within the concave portion 50, which means not protruding from the height of the concave portion 50, which may be a face of the housing 12.

The rest of the seven connection ports is a power terminal 64, used as a power connection port, connectable to an external power source. A concave portion 66 is formed at a portion of the housing 12 where the right side face 48 and the rear face 42 intersect with each other as shown in FIGS. 1 and 6. Specifically, at the bottom corner of the housing 12 at the +X side and +Y side (i.e., +Y side from the concave portion 50), the concave portion 66 is formed with a depth (i.e., depth in X-axis direction) greater than a depth of the concave portion 50. Such concave portion 66 can be accessed from the +X side and +Y side. The power terminal 64 can be inserted from the inner side of the housing 12 through an opening 66a formed on the bottom face of the concave portion 66.

Figure 13:
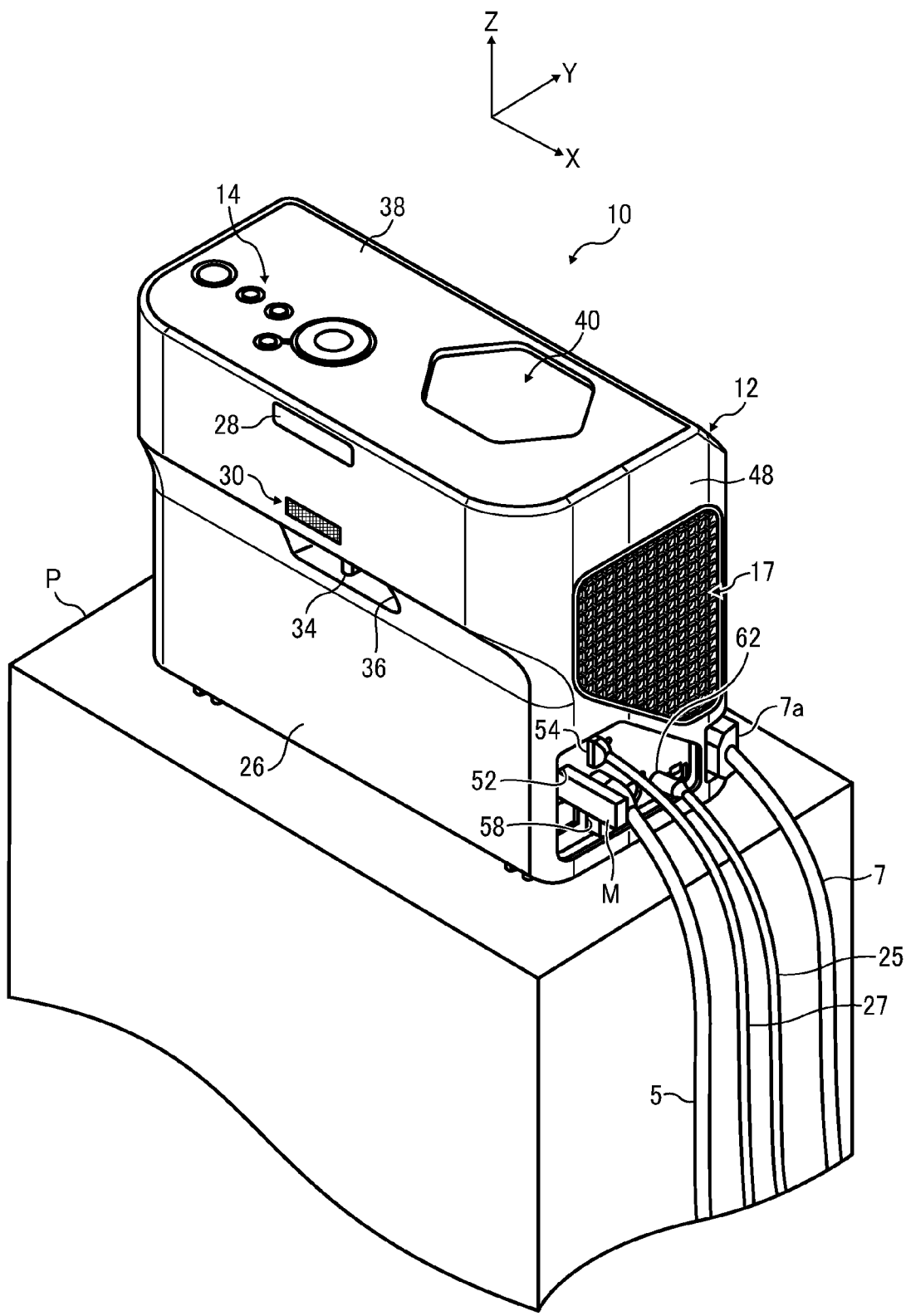
FIG. 13 shows a perspective view of a housing of the projector, in which cables are connected to a plurality of connection ports.

The power terminal 64 includes insertion dents 64a to insert a plurality of electrodes (e.g., three) of the terminal 7a of a power cable 7 (see FIG. 13). As shown in FIG. 13, when the terminal 7a of the power cable 7 is connected to the power terminal 64, a part of a connector block supporting the three electrodes (e.g., more than half of connector block) can be engaged to the concave portion 66, by which the falling off of power cable 7 can be prevented.

In an example embodiment, the plurality of connection ports of the connection unit 8 is inserted into openings formed on the right side face 48 of the housing 12. Instead of such configuration, for example, a connector unit such as for example a connector panel or box having the plurality of connection ports can be prepared, and the connector unit can be fit to an opening formed on the right side face 48 of the housing 12.

As shown in FIG. 2, the speaker 18 is connected to the control unit 20. The control unit 20 can be connected to an external device such as the DVD/video recorder R and PC via the HDMI terminal 54 and the audio input terminal 62 using an audio cable, and can be connected to the USB memory M via the USB terminal 52. Upon receiving audio/sound signals from such devices, the control unit 20 transmits the audio/sound signals to the speaker 18. The speaker 18 converts the audio/sound signals to audio/sound, and outputs the audio/sound. The output audio/sound is released from the housing 12 via the audio releasing port 30 (see FIG. 4).

As shown in FIG. 7, a gas-ejection port 19 is disposed at the upper part of the left side face 31, which is the −X side face or wall of the housing 12. The gas-ejection port 19 includes a plurality of through-holes 19a.

As shown in FIG. 7, the gas-ejection port 19 can be defined by a frame 35 formed on the left side face 31 of the housing 12. The frame 35 may have a rectangular opening shape. The plurality of through-holes 19a of the gas-ejection port 19 can be formed by the frame 35, and a lattice structure 33 arranged in the frame 35.

When viewed from the −X direction, for example, the frame 35 has a substantially rectangular shape, and the frame 35 is connected to the lattice structure 33 at a plurality of outer peripheral portions of the lattice structure 33. The rectangular area encircled by the frame 35 may be set to a given value such as for example one third (⅓) or so of the entire area of the left side face 31 of the housing 12. Further, the rectangular area encircled by the frame 35 may be set a given value which is smaller than the pentagonal area encircled by the frame 23.

Further, the frame 35 may be protruded a little in the −X direction with respect to the surface of the left side face 31 of the housing 12.

As shown in FIGS. 7 and 9, the lattice structure 33 includes a main lattice 43 of a two-dimensional lattice having an even thickness in the X-axis direction, and the column member 29a at each crossing point of the main lattice 43.

When viewed from the −X direction in FIG. 7, the column members 29a are arranged in a matrix, and, for example, 143 column members 29a are disposed. As shown in FIG. 9, the −X side end of the column member 29a has the protruded portion 41, which protrudes from the main lattice 29 into the −X side. The protruded portion 41, protruded from the main lattice 29 into the −X side, has a cross-sectional circular area greater than a square area at the crossing of the vertical lattice member 29b and the horizontal lattice member 29c.

Except the outer shape and part arrangement, the lattice structure 33 and the lattice structure 21 employ a similar configuration for the encircling frame and positional relationship, and functions. Further, in FIG. 7, each part of the lattice structure 33 may be assigned with the same reference characters of the lattice structure 21 such as the column member 29a, the vertical lattice members 29b, and the horizontal lattice members 29c as similar to FIG. 6.

Further, the opening area of the gas-ejection port 19 defined by the frame 35 becomes relatively great with respect the volume of the housing 12 as similar to the opening area of the gas-intake port 17. The opening area of the gas-ejection port 19 may be set smaller than the opening area of the gas-intake port 17.

When the fan 15 is activated and is rotated at a given speed, the greater the opening area of the gas-ejection port 19, the slower the outflow speed of the gas such as air outside the housing 12 via the gas-ejection port 19. Therefore, the greater the opening area of the gas-ejection port 19, the gas ejection sound such as wind noise at the gas-ejection port 19 can be further reduced.

Figure 8:
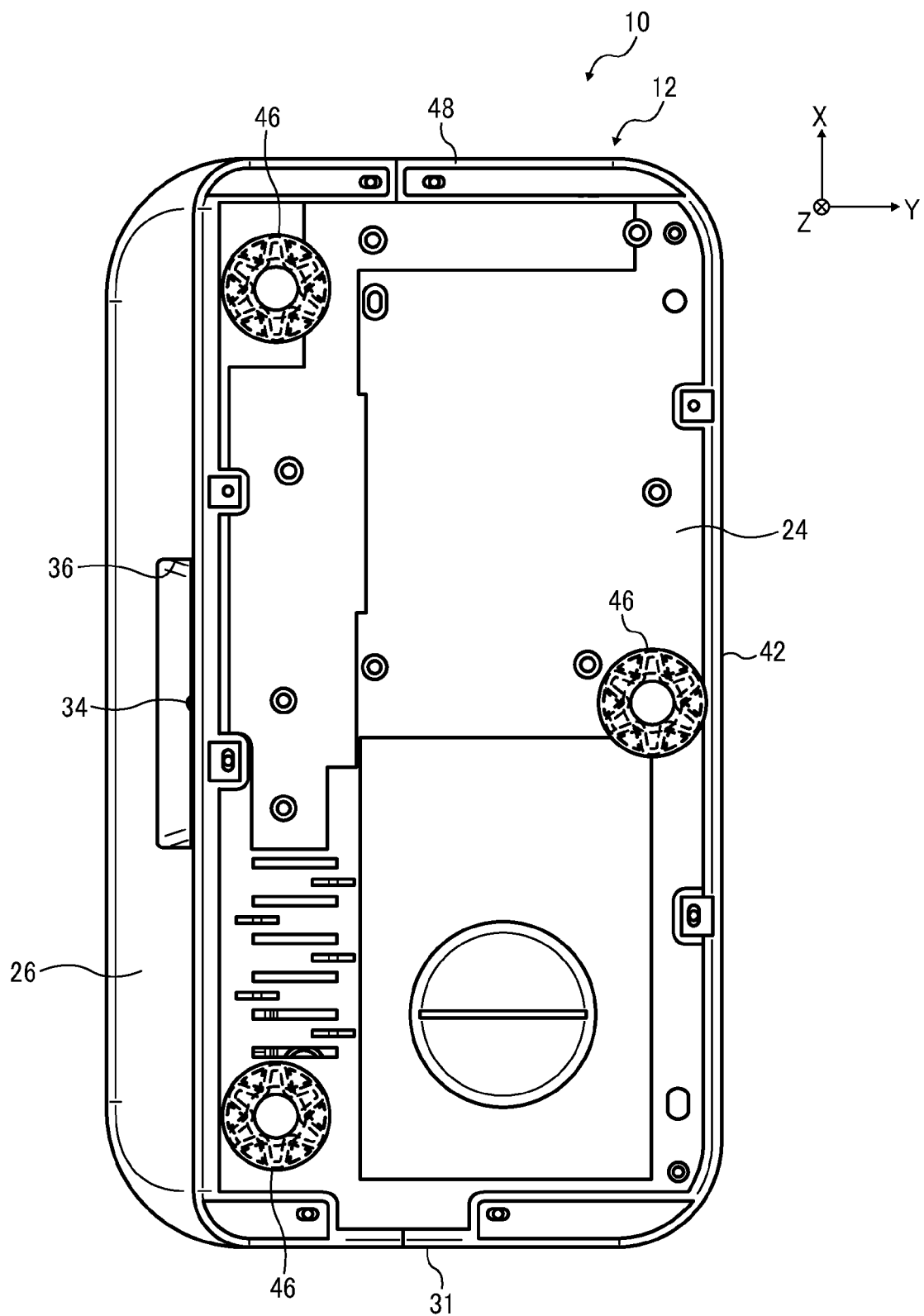
FIG. 8 shows a bottom view of the projector.

A description is given of legs of the housing 12. As shown in FIGS. 4 and 8, a base 24 of the housing 12 may be disposed with at least three legs 46 at triangular positions with each other. The three legs 46 may have a short leg and may not be aligned on the same straight line. Such leg is an example of supporter of the housing 12.

Each parts may be disposed in the housing 12 to set the weight balance of the projector 10 at the −Y side so that the −Y side becomes heavy compared to the +Y side. Therefore, the center of gravity of the projector 10 is, for example, set at a position of −Y side with respect to the center portion of the housing 12.

In an example embodiment, in view of such weight balance of the projector 10, as shown in FIG. 8, two of the three legs 46 are respectively disposed at a corner of the −Y side end and +X side end, and a corner of the −Y side end and −X side end on the base 24 of the housing 12, and the remaining one is disposed at a center of +Y side end on the base 24 of the housing 12. With such a configuration, the projector 10 can be supported at three points on a horizontal face by using the three legs 46, and thereby the projector 10 can stand with a stable manner, and is hard to fall down. Further, the positions of the three legs 46 can be preferably changed at any positions in view of the weight balance of the projector 10.

Each of the three legs 46 may have an axis along the Z-axis direction, and has a disk-like member such as a gear having formed the convexes and concaves on its periphery. For example, a screw type adjuster is employed for the legs 46 so that the height of the legs 46 disposed at the base 24 of the housing 12 can be adjusted. Therefore, a user can adjust the height of each of the legs 46 by rotating the legs 46 about the Z-axis, by which the posture of the housing 12 can be adjusted. With such a configuration, the projection angle of light projected from the housing 12 via the light projection port 40 can be adjusted. Because each of the legs 46 may be disposed with the gear member, the user can touch the gear effectively, by which the height adjustment can be conducted easily.

A description is given of an use environment of the projector 10 with reference to FIGS. 11 and 12, in which the projector 10 is used for a meeting of a plurality of participants.

As shown in FIG. 11, for example, a plurality of participants (e.g., seven) takes seats around a table T such as a rectangular table, wherein a long side of the table T extends along the Y-axis direction in a meeting room. Each one of the participants takes a seat at the +X, −X, and −Y sides of the table T while facing the table T.

Further, a screen S is extended along a wall W, which is positioned at the +Y side with respect to the table T. Further, the projector 10 may be placed on the platform P arranged near the lower part of the wall W or under the screen S as shown in FIG. 12, by a user, who is one of the participants.

When placing the projector 10 on the platform P, the user may move the projector 10, for example, by holding a portion of the housing 12 including the curved portion 26c (see FIGS. 6 and 7) with his both hands. The user places the projector 10 on the platform P by setting the front side of the housing 12 (i.e., the front face 26, which is the −Y side face of the housing 12) to the −Y direction in the meeting room, and distancing the housing 12 from the wall W for a given distance (e.g., several centimeters) so that a size of screen projected on the screen S becomes a desired size as shown in FIG. 12. Because the sloped portion 44 is disposed between the top face 38 and the rear face 42 (i.e., +Y side face) of the housing 12 as shown in FIGS. 6 and 7, the user can easily check the distance between the housing 12 and the wall W from the upward of the housing 12, by which the projector 10 can be placed on the platform P easily.

Because the projector 10 is a vertically-oriented projector, the length of the projector 10 in the depth direction (i.e., Y-axis direction) becomes short. Therefore, when the projector 10 is placed near the wall W, a space can be used efficiently. For example, compared to a horizontally-oriented projector having a longer length in the depth direction (i.e., Y-axis direction), the space between the projector 10 and the table T can be set greater. Further, even if a person exists in such space, the person may not interfere with the projector 10 such as the person does not block the light path projected from the projector 10.

After placing the projector 10, the user may adjust the height of at least one of the three legs 46 (see FIG. 8) to adjust the posture of the housing 12. For example, when the projector 10 is placed near the wall W, the two legs 46 disposed at the −Y side end on the base 24 are set far from the wall W while the two legs 46 are being distanced with each other in the X-axis direction, and the one leg 46 disposed at the +Y side end on the base 24 is set closer to the wall W. Therefore, by using the height of the one of the legs 46 at the +Y side end on the base 24 as a reference height, the user can adjust the height of at least one of the two legs 46 at the −Y side end on the base 24, by which the posture of the housing 12 can be adjusted easily, and thereby the projection angle of light projected from the light projection port 40 can be adjusted easily.

Further, after placing the projector 10, cables or the like are connected to corresponding connection ports as shown in FIG. 13. Specifically, at first, the user connects the power cable 7 to the power terminal 64 (see FIG. 6) by inserting the three electrodes disposed at the terminal 7a of the power cable 7 to the corresponding insertion dents 64a of the power terminal 64 (see FIG. 6). When the power cable 7 is connected to the power terminal 64, the power cable 7 may droop from the housing 12. Because a part of the connector block supporting the three electrodes of the terminal 7a engages with the concave portion 66, the falling off of power cable 7 can be prevented.

Hereinafter, the personal computer PC, the USB memory M, and the DVD/video recorder R having a HDMI terminal may be used as examples of external devices or memories connected to the projector 10 (see FIGS. 2 and 11). The personal computer PC and the DVD/video recorder R may be placed on the table T, and operated by one or more of the meeting participants.

The user may connect cables as follows: an audio cable 25 is used to connect the personal computer PC and the audio input terminal 62, in which one end of the audio cable 25 is connected to an audio output terminal of the personal computer PC, and another end of the audio cable 25 is connected to the audio input terminal 62. Further, a high definition multimedia interface (HDMI) cable 27 is used to connect the DVD/video recorder R and the HDMI terminal 54, in which one end of the HDMI cable 27 is connected to a HDMI terminal of the DVD/video recorder R, and another end of the HDMI cable 27 is connected to the HDMI terminal 54. Further, a RGB cable 5 is used to connect the personal computer PC and the computer terminal 58, in which one end of the GB cable 5 is connected to a RGB output terminal of the personal computer PC and another end of the RGB cable 5 is connected to the computer terminal 58. Further, a terminal of the USB memory M can be connected to the USB terminal 52.

Because the plurality of connection ports are disposed within a given area on the right side face 48 of the housing 12, which is the +X side face of the housing 12, the user can easily connect each cable end and memory terminal to the corresponding connection port without puzzlement.

Further, as above described, one end of the cable is connected to the projector 10, and another end of the cable is connected to a corresponding external device. Then, a portion of the cable, corresponding to from the one end to middle of the cable, may droop from the housing 12 and the platform P (see FIG. 13), the middle of the cable crawls on the floor F (see FIG. 12), and a portion of the cable, corresponding to from the middle to another end of the cable, may droop from the table T.

After connecting cables to the projector 10, the user activates the personal computer PC and/or the DVD/video recorder R so that image data and/or audio information can be transmitted to the projector 10.

Then, the user presses the power button on the operation unit 14 or the remote controller to activate the projector 10. Then, the user can switch an input source to the projector 10 between the personal computer PC, the DVD/video recorder R, and the USB memory M by pressing the input button 70. With such setting, image data and/or audio information can be transmitted from the personal computer PC, the DVD/video recorder R, or the USB memory M to the control unit 20. Then, the control unit 20 activates the light source 80, and transmits the audio information to the speaker 18. Further, when the remote controller is used for the operation, a transmitting unit of the remote controller is directed to the light detecting unit 28, and then a button on the remote controller is pressed.

When the light source 80 is activated, the light source 80 emits light. The emitted light is guided to the light projection port 40 (see FIG. 5) via the color wheel 82, the light tunnel 84, the condenser lenses 86 and 88, the mirrors 90 and 92, the DMD 94, the projection lens 96, the minor 97, the free-form-surface mirror 98 (see FIG. 3). The guided light can be projected to an upward oblique direction of the housing 12 such as the +Y side and +Z side of the housing 12, which is the upward oblique direction with respect to the rear face 42 (i.e., +Y side face of the housing 12) from the light projection port 40 (see FIG. 12), by which a color image or a monochrome image can be projected with an effective size on the screen S. Because the projector 10 is disposed near the screen S, persons or objects rarely enter the light-path of the light projected from the projector 10, by which the projected light may not be blocked persons or objects.

The user can move (e.g., pivot) the focus adjustment lever 34 along the front face 26 (i.e., −Y side face of the housing 12) to adjust the focus of the projection lens 96, by which focused image can be projected on the screen S. Because the focus adjustment lever 34 is disposed at the center of the front face 26 (i.e., −Y side face of the housing 12), and is moveable ((e.g., pivotable) about the Z-axis, the user can easily operate the focus adjustment lever 34 whenever the user is at any position of the +X side, −X side, and −Y side of the housing 12.

Further, in addition to such focus adjustment, the user presses the menu button on the operation unit 14 or the remote controller, as required, to display menu items on the screen S. By pressing the cursor 76 and the enter button 74, the user can select and set, for example, the image adjustment mode, and the image setting mode to adjust the size of image, the position of image, the brightness of image, the contrast of image, and the density of color.

Further, when the audio information is transmitted to the speaker 18, the speaker 18 converts the audio information to audio and outputs audio outside the housing 12 via the audio releasing port 30. Further, the volume of audio output from the speaker 18 can be adjusted by operating a cursor on the operation unit 14 or the remote controller.

With such operations, the participants of the meeting can see image and listen audio output from the projector 10.

Further, during the meeting, the user can stop the image and audio output from the projector 10 temporally by pressing the mute button on the operation unit 14 or the remote controller, in which images from other projector or an over head projector (OHP) can be projected on the screen S temporally.

Further, when the projector 10 is activated, the fan 15 of the cooling device 22 (see FIG. 2) is activated and rotated at a low speed. Then, gas such as air inflows in the duct or the housing 12 via the gas-intake port 17. The gas such as air flows along each of the heat sink to suck heat released from the heat sink, and then the gas outflow outside of the duct or the housing 12 via the gas-ejection port 19. With such a configuration, the heat generation device such as the CPU 11, the light source 80, or the like can be cooled effectively and efficiently, by which the abnormal operation of the CPU 11, and the exhaustion and damages of the light source 80 can be prevented.

Each of the cables connected to the corresponding connection port is positioned under the gas-intake port 17 (see FIG. 13), by which the air inflow into the duct via the gas-intake port 17 is not blocked by each one of the cables.

A description is given of connection/disconnection operations of cable or the like for the projector 10. For example, during the meeting, the connection/disconnection operations of cable may be conducted for the projector 10 to add or change an external device or memory connected to the projector 10. In such a case, a cable or a memory is disconnected from at least one of the connection ports of the connection unit 8 by the user, who may be present at the −Y side of the projector 10. When connecting or disconnecting the cables, the terminal of the cable is hold by a hand of the user to prevent breaking of the cable. Further, the added or changed external devices may be, for example, the personal computer PC, the USB memory M, the DVD/video recorder R, a liquid crystal monitor, an audio amplifier, a DVD player, and a video player, but not limited thereto.

As shown in FIG. 13, the connection unit 8 has the plurality of connection ports such as seven connection ports. Out of the seven connection ports, the six connection ports may be connected or disconnected with cables or the like with a relatively greater number of frequencies. Such six connection ports may be set at the −Y side portion of the right side face 48 of the housing 12. In such a configuration, the six connection ports can be set at a position closer to the user, by which the connection/disconnection operation can be conducted smoothly. For example, the USB terminal 52 may be disposed at the most −Y side and +Z side in the connection unit 8 (see FIG. 6). Therefore, when the USB memory M is connected or disconnected with respect to the USB terminal 52, cables connected to other connection ports may not block the connection/disconnection operation of the USB memory M.

In contrast, one connection port used as the power terminal 64 is disposed at a position, which is the farthest from the user. Specifically, the power terminal 64 is disposed at the most +Y side of the right side face 48 of the housing 12 because the connection/disconnection operation of the power cable 7 for the power terminal 64 may be relatively not so frequent. In such a configuration, when cables or the like are connected or disconnected to other six connection ports, the power cable 7 connected to the power terminal 64 does not interfere the connection/disconnection operation of other cables. Further, because the terminal 7a of the power cable 7 is positioned at the farthest from the user that conducts the connection/disconnection operation of cables, the user may not misrecognize the power cable 7 as other cables, and thereby the power cable 7 may not be disconnected unintentionally or by error by the user.

If a connection port is disposed on the front face 26 of the housing 12 (i.e., −Y side of the housing 12), a cable connected to the connection port may droop from the −Y side of the housing 12 as indicated by the dotted line of FIG. 12. If, for example, a person comes near the −Y side of projector 10 under such situation, the cable may cause a trouble such as trapping legs of the person. In an example embodiment, as shown in FIG. 12, a cable such as the RGB cable 5 connected to the connection port may droop from the +X side face of the housing 12. Therefore, even if a person comes near the −Y side of projector 10, the cable may not cause a trouble such as trapping legs of the person.

The projector 10 can be used in the meeting room as such. After the meeting, the user presses the power button on the operation unit 14 or the remote controller to stop the power supply to the projector 10, and then removes or disconnects the cables connected to the plurality of connection ports.

Further, in the above described projector 10, the light projection port 40 is disposed on the top face 38 of the housing 12, and the plurality of connection ports (e.g., seven) of the connection unit 8 are disposed on the right side face 48, which is the +X side face of the housing 12. The projector 10 is placed at a position near to the projection face such as the screen S, and cables are connected to the plurality of connection ports of the connection unit 8. In such a case, the cables connected to the plurality of connection ports may droop from the right side face 48, which is the +X side face of the housing 12. Therefore, even if a person comes near the −Y side of projector 10, which is a space opposite to the projection face such as the screen S with respect to the housing 12, the cable may not cause a trouble such as trapping legs of the person.

Further, as above described, when the projector 10 is placed near the wall W having the screen S, among the plurality of connection ports of the connection unit 8, the power terminal 64 having the least frequency of cable connection/disconnection operation is positioned at the most +Y side (or the wall W side). With such a configuration, when cables or the like are connected or disconnected to the connection ports not used for the power terminal 64, the power cable 7 connected to the power terminal 64 does not interfere the connection/disconnection operation of cables, and further, because the terminal 7a of the power cable 7 is positioned at the farthest from the user that conducts the connection/disconnection operation of cables, the power cable 7 may not be disconnected by error by the user. Therefore, the connection/disconnection operation of cables with respect to the plurality of connection ports can be conducted smoothly.

Further, as shown in FIG. 1, the concave portion 66 used for the power terminal 64 is formed at a corner of +X side and +Y side of the housing 12, which means the power terminal 64 can be accessed from both of the +X side and +Y side. Therefore, the connection/disconnection operation of the power cable 7 with respect to the power terminal 64 can be conducted smoothly.

Further, as shown in FIG. 13, the plurality of connection ports may be disposed at the lower side of the right side face 48 of the housing 12. Therefore, when the connection/disconnection operation of cables with respect to the plurality of connection ports is conducted, a moment to lean the housing 12 is hard to occur, by which the unstable condition of the housing 12 is hard to occur. Therefore, the connection/disconnection operation of cables with respect to the plurality of connection ports can be conducted smoothly.

As above described, in the above described projector 10, the connection/disconnection operation of cables with respect to the plurality of connection ports can be conducted smoothly by the user. Therefore, the connection/disconnection operation of the projector 10 and external devices can be conducted smoothly and faster before, during, and after the meeting, by which the preparation, progress, and ending of the meeting can be conducted smoothly.

Further, in the above described projector 10, the housing 12 includes the frames 23/35, the main lattices 29/43 and a plurality of protruded portions 41. The frames 23/35 and the main lattices 29/43 include the gas-flow port such as the gas-intake port 17 and the gas-ejection port 19 having a plurality of through-holes. The plurality of protruded portions 41 projects from the main lattices 29/43 along the gas-flow direction (or X-axis direction) of the gas-flow port.

In an example embodiment, the plurality of protruded portions 41 protrudes along the gas-flow direction of the gas-flow port, by which the pressure loss of the gas flow can be reduced compared to a conventional projectors disclosed in JP-2003-215710-A that dispose a plurality of loopers (e.g., plate member) near the gas-flow port by slanting the loopers from the gas-flow direction of the gas-flow port.

Further, when the housing 12 is viewed from the +X side such as from the gas-intake port 17 and the −X side such as from the gas-ejection port 19 with a given oblique direction (excluding a direction such as the exact +X direction or −X direction), a part of each one of the through-holes configuring the gas-flow port is concealed by the protruded portion 41 set around the through-holes, by which the inside of the housing 12 is hard to see via each one of the through-holes. Therefore, while attaining a concealing effect, the pressure loss of the gas flow can be reduced.

Further, in the above described projector 10, the column member 29a is disposed at each crossing point of the lattice, by which the crossing point can be reinforced. Therefore, even if the thickness of the main lattices 29/43 in the X-axis direction is thin (or the length in the gas-flow direction of the gas-flow port is short), the main lattices 29/43 can secure enough rigidity. Further, by disposing the protruded column 41, the inside of the housing 12 is hard to see via each one of the through-holes. Therefore, while a concealing effect is secured, the pressure loss of the gas flow can be further reduced.

As such, the protruded portion 41 can conceal the inside the housing 12. Further, the protruded portion 41 can conceal each one of the through-holes configuring the gas-flow port such as the gas-intake port 17 and the gas-ejection port 19, by which presence of the gas-intake port 17 and the gas-ejection port 19 can be reduced as much as possible, and the degradation of appearance of the projector 10 can be prevented.

Further, the protruded portion 41 having a columnar shape protrudes at each crossing point of the lattice of the main lattices 29/43 of the lattice structures 21 and 33. Therefore, the lattice structure 21 and the lattice structure 33 can be seen as a specific pattern drawn on the housing 12 (see FIG. 1). As such, as for the projector 10, the lattice structures 21 and 33 have a concealing effect, and give a specific design effect.

Further, the column member 29a having the protruded column 41 is disposed at each crossing point of the lattice while protruding the protruded column 41 of the column member 29a outside of each crossing point of the lattice of the main lattice 29 or 43. Such a configuration can enhance the rigidity at the boundary of the protruded column 41 and the main lattices 29/43 compared to a configuration that the protruded column 41 is attached to the main lattices 29/43 from, for example, one side (see FIG. 17).

Further, in the above described projector 10, the opening area of the gas-intake port 17 and the gas-ejection port 19 is set great with respect the volume of the housing 12. Therefore, when the fan 15 is activated, gas inflows into the housing 12 with a slow speed via the gas-intake port 17, and the gas outflows from the housing 12 with a slow speed via the gas-ejection port 19. Therefore, the gas intake sound and the gas ejection sound can be reduced.

Further, as above described, because the fan 15 is activated and rotated at a low speed, the driving sound of the fan 15 such as wind noise can be reduced, and the gas flow speed via the gas-intake port 17, and the gas flow speed via the gas-ejection port 19 become further slow speed, by which the gas intake sound and the gas ejection sound can be further reduced.

Further, when the projector 10 is used under the use environment shown in FIG. 11, the gas-intake direction at the gas-intake port 17 (see an arrow IN of FIG. 11), and the gas-eject direction at the gas-ejection port 19 (see an arrow OUT of FIG. 11) are not directed to the meeting participants. Therefore, the gas intake sound and the gas ejection sound including wind noise at the fan 15, at the gas-intake port 17, and at the gas-ejection port 19 are further hard to be heard by the meeting participants. Further, heated gas-flow ejected via the gas-ejection port 19 may not flow to the meeting participants.

Further, the heat generation device such as the CPU 11, the light source 80, or the like is connected to the corresponding heat sink. The heated gas-flow sucking the heat released from the heat sink is ejected to the −X side of the housing 12 via the gas-ejection port 19 formed on the left side face 31, which is the −X side face of the housing 12 (see an arrow OUT of FIG. 11). Further, the light modulated based on image data is projected to the upward oblique direction of the housing 12, which is the +Z side and +Y side of the housing 12, via the light projection port 40 formed on the top face 38 of the housing 12 (see FIG. 12). In such a configuration, the flow path of heated gas-flow ejected via the gas-ejection port 19 is deviated from the light projection path of the light projection port 40. Therefore, the heated gas-flow dose not affect the light, corresponding to image data and projected via the light projection port 40, and thereby blurring of the image of projected light can be prevented.

Further, the light projection port 40 may be formed on the top face 38 of the housing 12 at a position close to the right side face 48 having the gas-intake port 17, which is the +X side face of the housing 12. As such, the light projection port 40 may be formed at a position far from the left side face 31 having the gas-ejection port 19, which is the −X side face of the housing 12 (see FIG. 5), by which the effect of heated gas-flow to the light, projected via the light projection port 40, can be further reduced.

As such, the projector 10 may have a stable light projection performance, an effective cooling performance, an effective small sound noise performance, and a specific design effect.

As for the projector 10 used as a vertically-oriented projector, a plurality of press-type controls such as pushbuttons can be disposed on the top face 38 of the housing 12, in which the pushbuttons are moveable in an upward/downward.

In such a configuration, each of the pushbuttons is pressed by applying an external force, which is applied into the vertical downward direction. Therefore, when each of the pushbuttons is pressed, only gravity and the external force effecting into the vertical downward direction is applied to the projector 10. Therefore, when each of the pushbuttons is pressed on the projector 10, an external force effecting into the horizontal direction and a moment about the Z-axis are not applied to the projector 10, and thereby the positional deviation of the housing 12 can be prevented.

As shown in FIGS. 1, 6, 7, and 13, the height of the housing 12 is set longer than the length of the base 24 in the Y-axis direction. Therefore, if, for example, an external force effecting into the +Y direction is applied to the front face 26, which is the −Y side face of the housing 12, the housing 12 may rotate about one of the legs 46 disposed at the +Y side of the housing 12, by which the housing 12 may lean about the X-axis.

In an example embodiment, as above described, when each of the pushbuttons is pressed, an external force effecting in the +Y direction is not applied to the projector 10. If the pushbuttons are disposed on the front face 26, which is the −Y side face of the housing 12, and are press-able into the +Y direction of the housing 12, the housing 12 may lean and become an unstable condition.

In contrast, in an example embodiment, because the press-type controls such as pushbuttons are disposed on the top face 38 of the housing 12, the housing 12 may not lean and become an unstable condition, and thereby the falling down of the housing 12 can be prevented.

Further, the focus adjustment lever 34 may be moved (e.g., pivoted) in a direction along the front face 26, which is the −Y side face of the housing 12. Therefore, an external force into the Y-axis direction and the moment about the Z-axis may barely occur and affect the center of gravity of the projector 10. Therefore, the positional deviation of the housing 12 can be prevented, and the leaning of the housing 12 (i.e., unstable condition) can be prevented.

Further, the focus adjustment lever 34 has the X-, Y-, Z-positions in the housing 12. Because the X-position of the focus adjustment lever 34 can be set substantially same as the X-position of the center of gravity of the projector 10, even if a force into the +Y direction of the housing 12 is applied to the housing 12 when the focus adjustment lever 34 is operated, the positional deviation of the housing 12 may hard to occur, especially, a rotation about the Z-axis may hard to occur.

In the above described projector 10, the control such as the pushbuttons can be disposed on the top face 38 of the housing 12, and are moveable in an upward/downward. Further, the control such as the focus adjustment lever 34 can be disposed on the front face 26 (i.e., −Y side face of the housing 12), and is moveable in the X-axis direction with a given stroke. With such a configuration, even if such control is operated, the positional deviation of the housing 12, and resultant unstable condition of the housing 12 can be prevented.

In the above described example embodiment, the types, numbers, and arrangement patterns of the connection ports are not limited to the above described example case, but can be changed as required.

In the above described example embodiment, the plurality of connection ports of the connection unit 8 is disposed on the right side face 48 of the housing 12, which is the +X side face of the housing 12. Instead of such configuration, the plurality of connection ports of the connection unit 8 can be, for example, disposed on the left side face 31 of the housing 12, which is the −X side face of the housing 12. In such a case, the plurality of connection ports is preferably disposed at a position lower than the gas-ejection port 19. With such a configuration, the cables connected to the plurality of connection ports does not block the gas-ejection port 19, which mean the gas ejection from the gas-ejection port 19 is not blocked by the cables, and the heated gas-flow ejected via the gas-ejection port 19 does not hit the cable.

In the above described example embodiment, the gas-intake port 17 is formed on the right side face 48 of the housing 12, which is the +X side face of the housing 12, and the gas-ejection port 19 is formed on the left side face 31 of the housing 12, which is the −X side face of the housing 12.

Further, the gas-intake port 17 and the gas-ejection port 19 can be formed on the −Y and +Y faces of the housing 12. For example, the gas-intake port 17 and the gas-ejection port 19 can be formed on the −Y and +Y faces of the housing 12, in which one of the gas-intake port 17 and the gas-ejection port 19 is formed on the front face 26 of the housing 12, and another one is formed on the rear face 42 of the housing 12, which is the +Y side face of the housing 12. In such a case, the plurality of connection ports is preferably disposed at a position on the face lower than the gas-intake port and the gas-ejection port.

In the above described example embodiment, the numbers of connection ports arranged at a portion lower than the gas-intake port 17 formed on the right side face 48 of the housing 12 is seven, but the numbers of connection ports is not limited these. For example, the numbers of connection ports may be six or less, or eight or more.

In the above described example embodiment, the plurality of connection ports (e.g., seven) is disposed in two stages such as upper and lower stages. However, the plurality of connection ports can be disposed other way. For example, the plurality of connection ports can be disposed in one stage, three stages such as upper/middle/lower stages, or the like.

Further, the shape, size, numbers, and arrangement patterns of a plurality of protruded members (e.g., protruded column 41) protruded from the main lattices 29/43 is not limited to the above described example. Specifically, the shape of the plurality of protruded members (e.g., protruded column 41) protruded from the main lattices 29/43 is not limited to columnar or cylindrical shape, but other shapes can be set for the protruded members. For example, the shapes of the protruded member may be a pillar shape such as polygonal pillar (see FIG. 18) and ellipse pillar, or may be a tapered shape or frustum shape such as a pyramidal frustum, a circular truncated cone, and an ellipse truncated cone.

Further, the plurality of protruded member disposed at each crossing point of the main lattices 29/43 may have different shapes, sizes, and positions with each other.

In the above described example embodiment, the column member 29*a* having the protruded column 41 is disposed at each crossing point of the lattice of the main lattices 29/43. The numbers of the column members 29*a* is not limited such case disposing the column member 29*a* at each crossing point of the lattice. For example, the column member 29*a* is disposed at least one crossing point of the lattice of the main lattices 29/43.

Further, the height and diameter of the protruded column 41 is not limited to the above described values, but can be changed as required. In the above described example embodiment, the height and diameter of the protruded column 41 are set in view of balancing the reduction of the pressure loss of the gas flow at the gas-intake port and the gas-ejection port, securing a given area for the opening area of the gas-intake port and the gas-ejection port, and a concealing function of the protruded column 41. For example, the height of the protruded column 41 is set to about from one third (⅓) to two thirds (⅔) of the thickness of the main lattices 29/43 (i.e., length in the X-axis direction), and the diameter of the protruded column 41 is set to about from one third (⅓) to two thirds (⅔) of the lattice pitch of the main lattices 29/43. However, the height and diameter of the protruded column 41 are not limited thereto.

For example, the height of the protruded column 41 can be set less than one third (⅓) of the thickness of the main lattices 29/43 (i.e., length in the X-axis direction), or the height of the protruded column 41 can be set longer than two thirds (⅔) of the thickness of the main lattices 29/43. Further, the diameter of the protruded column 41 can be set less than one third (⅓) of the lattice pitch of the main lattices 29/43, or the diameter of the protruded column 41 can be set longer than two thirds (⅔) of lattice pitch of the main lattices 29/43.

Specifically, if the priority is placed for the reduction of pressure loss and the securing of the opening area, the height of the protruded column 41 is set, for example, less than one third (⅓) of the thickness of the main lattices 29/43, and the diameter of the protruded column 41 is set, for example, less than one third (⅓) of the lattice pitch of the main lattices 29/43. In contrast, if the priority is placed for the concealing function, the height of the protruded column 41 is set, for example, longer than two thirds (⅔) of the thickness of the main lattices 29/43, and the diameter of the protruded column 41 is set, for example, longer than two thirds (⅔) of lattice pitch of the main lattices 29/43.

In the above described example embodiment, the protruded portion 41, disposed at each crossing point of the lattice of the main lattices 29/43, protrude the outward of the housing 12, wherein such outward protruded portion of the column member 29*a* is referred to the protruded column 41.

Figure 15A:
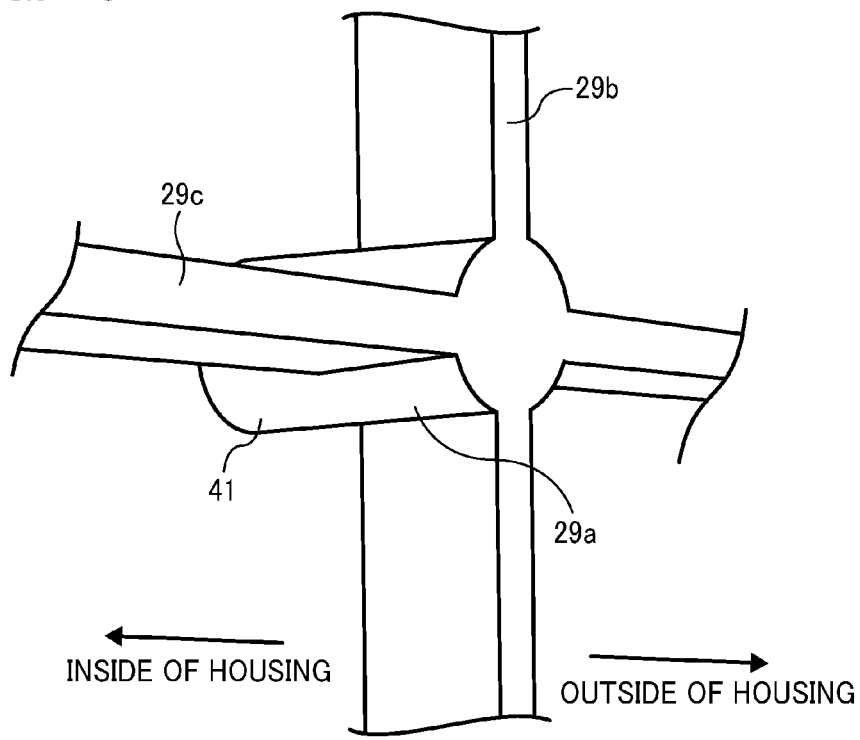
FIG. 15A shows a partial perspective view of another lattice structure.
Figure 15B:
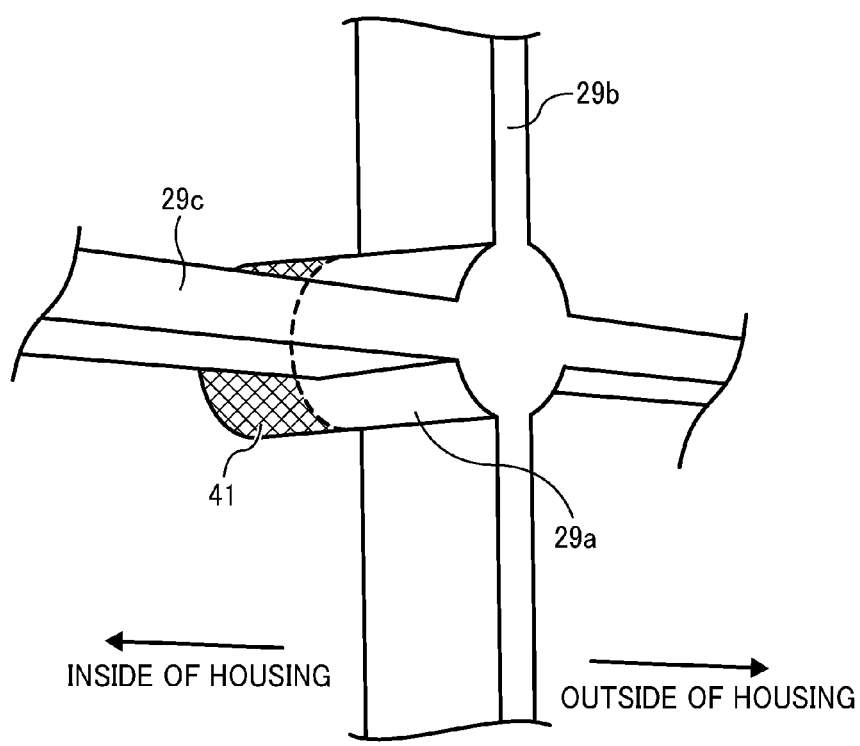
FIG. 15B shows a protruded member thereof, which can function as a concealing member.

Further, instead of such outward protruded portion, an inward protruded portion can be used as shown in FIG. 15A, in which the protruded portion 41 is disposed at each crossing point of the lattice of the main lattices 29/43 while protruding to an inward of the housing 12. As such, the protruded column 41 of the column member 29*a* may be used as an inward protruded portion. In such a configuration, as shown in FIG. 15B, a given area inside the housing 12 corresponding to a cross-hatched portion of the column member 29*a* can be concealed by the protruded column 41. Further, in such a configuration, an outer face of the housing 12 corresponding to the main lattices 29/43 may be set flush with an outer face of the frames 23/35, or the outer face of the housing 12 corresponding to the main lattices 29/43 may be set at an inward position compared to the outer face of the frames 23/35 on the housing 12.

Figure 16A:
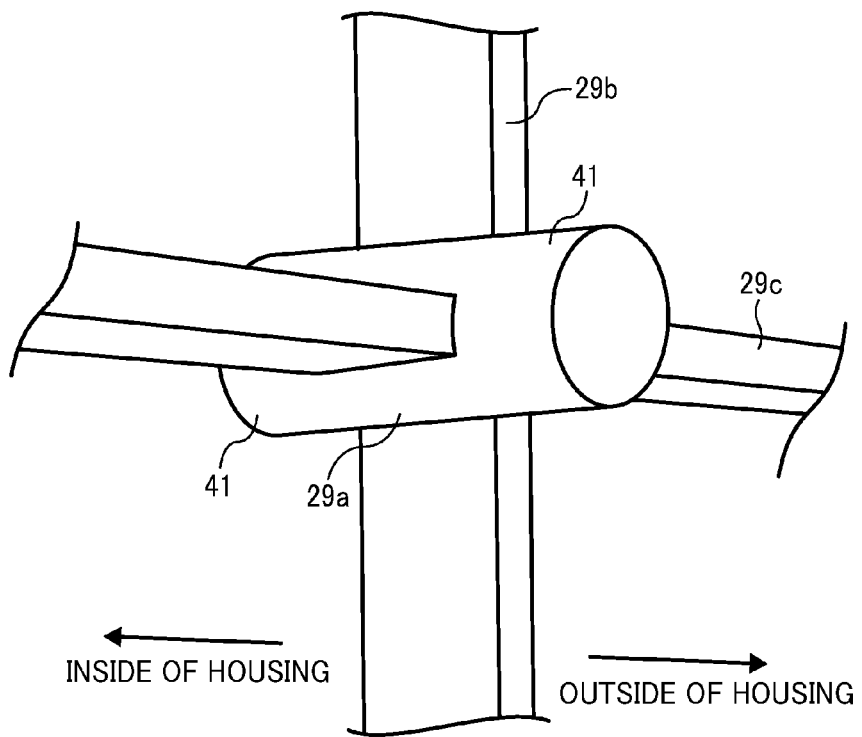
FIG. 16A shows a partial perspective view of another lattice structure.
Figure 16B:
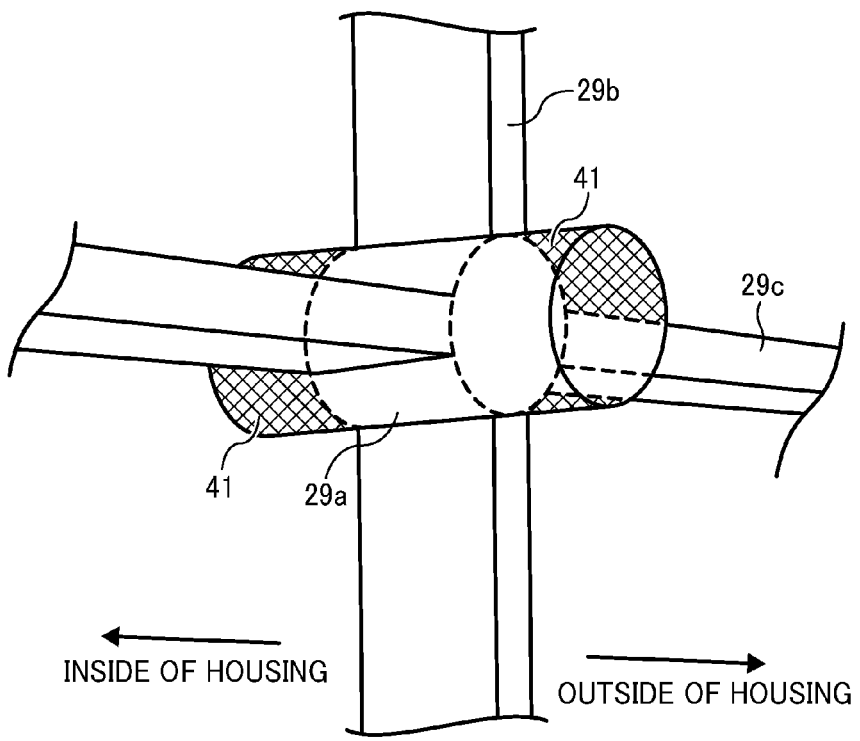
FIG. 16B shows a protruded member thereof, which can function as a concealing member.

Further, as shown in FIG. 16A, the column member 29*a* disposed at each crossing point of the lattice of the main lattices 29/43 can be protruded to both the outward and inward of the housing 12, and such protruded portion can be used as the protruded portion 41. In such a configuration, as shown in FIG. 16B, a given area inside the housing 12 corresponding to a cross-hatched portion of the column member 29*a* can be concealed by the protruded column 41.

Figure 17:
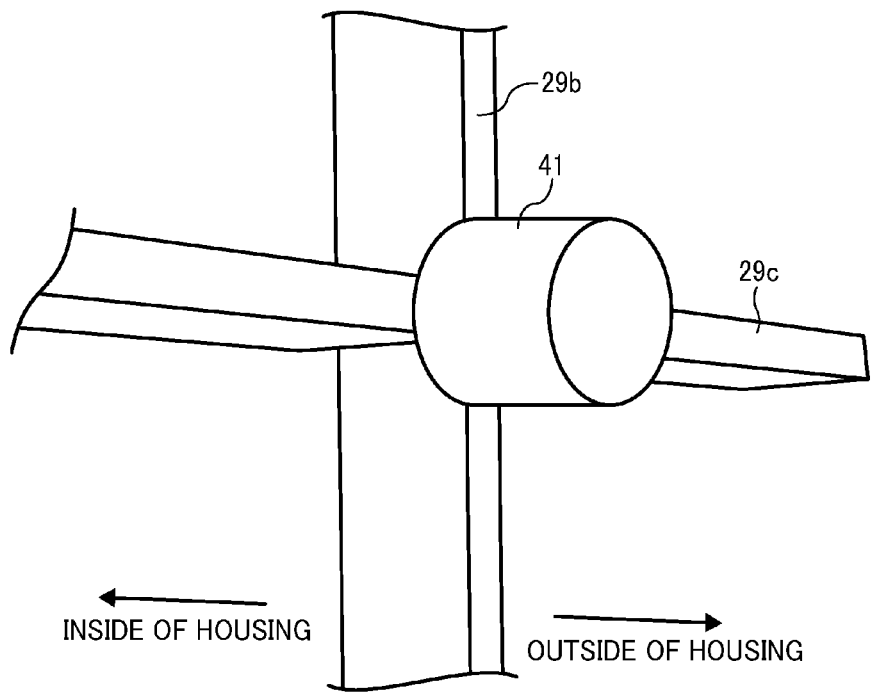
FIG. 17 shows a partial perspective view of another lattice structure.

In the above described example embodiment, the protruded column 41 is provided as a part of the column member 29*a*. Further, for example, the protruded column 41 alone can be disposed at least one of the crossing points of the lattice of the main lattices 29/43 as shown in FIG. 17.

Figure 18:
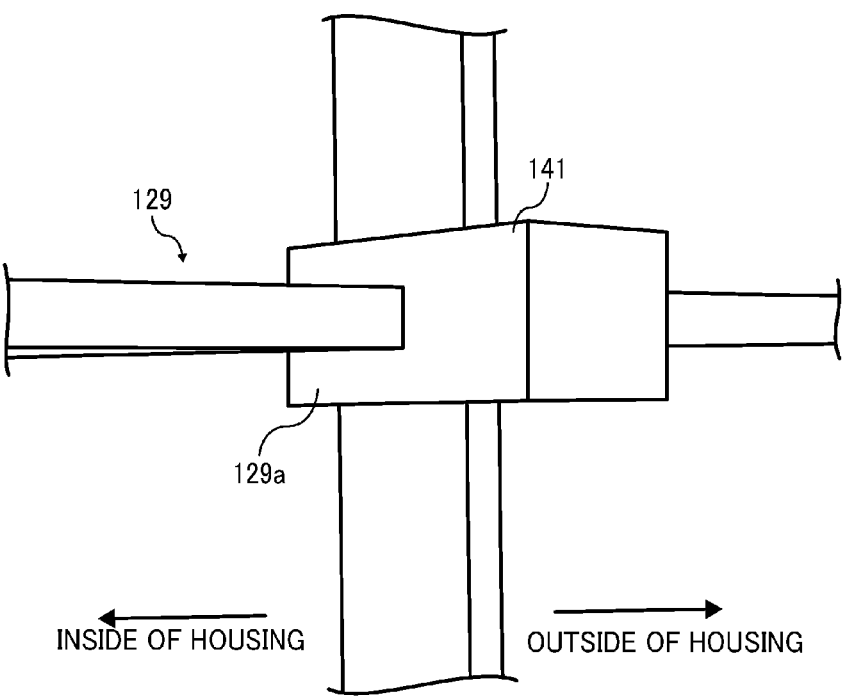
FIG. 18 shows a partial perspective view of another lattice structure.

In the above described example embodiment, the column member 29*a* having the protruded column 41 is disposed at each crossing point of the lattice of the main lattices 29/43. Instead of such column member 29*a*, as shown in FIG. 18, a prism member 129*a* having a prism-shaped protrusion 141 can be disposed at each crossing point of the lattice of a main lattice 129. The prism member 129*a* having the prism-shaped protrusion 141 may have, for example, a rectangular parallelepiped shape as a whole. As shown in FIG. 18, the prism-shaped protrusion 141 can be protruded to the outward of the housing 12. Further, the prism-shaped protrusion 141 can be protruded to the inward of the housing 12. Further, the prism-shaped protrusion 141 can be protruded to both of the outward and inward of the housing 12, in which one prism-shaped protrusion 141 protrudes to the outward of the housing 12, and another prism-shaped protrusion 141 protrudes to the inward of the housing 12.

Further, in the above described example embodiment, the length of the main lattices 29/43/129 in the X-axis direction, and the lattice pitch of the main lattices 29/43/129 can be changed, as required. The length of the main lattices 29/43/129 in the X-axis direction is the length along the through-holes, and the lattice pitch is the distance between the axes of two column members 29*a* adjacently disposed in the Y-axis and the Z-axis directions.

In the above described example embodiment, the lattice pitch that defines and forms the plurality of through-holes of the gas-flow port such as the gas-intake port 17 and the gas-ejection port 19 may be set with the same pitch for the main lattices 29/43/129. However, the lattice pitch may not be required to set with the same pitch. For example, one lattice pitch can be set differently from other lattice pitch of the main lattices 29/43/129.

Further, by rotating the main lattices 29/43 about the X-axis for a given angle such as 0° to 90°, the plurality of through-holes of the gas-flow port such as the gas-intake port 17 or the gas-ejection port 19 can be defined and formed depending on the rotated angle.

In the above described example embodiment, the plurality of through-holes of the gas-flow port such as the gas-intake port 17 and the gas-ejection port 19 is defined and formed by crossing a plurality of long and narrow members in a perpendicular direction with each other. However, the long and narrow members may not be required to be crossed in the perpendicular direction with each other. For example, the plurality of through-holes of the gas-flow port can be formed by intersecting the long and narrow members with each other with any angle.

In the above described example embodiment, the plurality of through-holes of the gas-flow port such as the gas-intake port 17 and the gas-ejection port 19 is defined and formed by intersecting the plurality of long and narrow members extending in one direction and another direction. Further, the plurality of through-holes of the gas-flow port can be defined and formed, for example, by intersecting a plurality of curved long and narrow members.

In the above described example embodiment, the plurality of through-holes of the gas-flow port such as the gas-intake port 17 and the gas-ejection port 19 is defined and formed by the main lattices 29/43/129 and the frames 23/35 encircling the main lattices 29/43/129. Further, the plurality of through-holes of the gas-flow port can be formed, for example, by hollowing out a wall face of the housing 12.

In the above described example embodiment, the gas-intake port 17 is disposed on the right side face 48 of the housing 12 (i.e., +X side face of the housing 12), and the gas-ejection port 19 is disposed on the left side face 31 of the housing 12 (i.e., −X side face of the housing 12). Instead of such configuration, the gas-intake port and the gas-ejection port can be disposed on different portions of the housing 12, and preferably, the gas-intake port and the gas-ejection port are disposed on different faces or walls of the housing 12.

In the above described example embodiment, the protruded column 41 is disposed at each crossing point of the lattice of the main lattices 29/43/129. In addition, the protruded column 41 can be disposed at a portion of the main lattices 29/43/129, which is other than the crossing point of the lattice.

Figure 19:
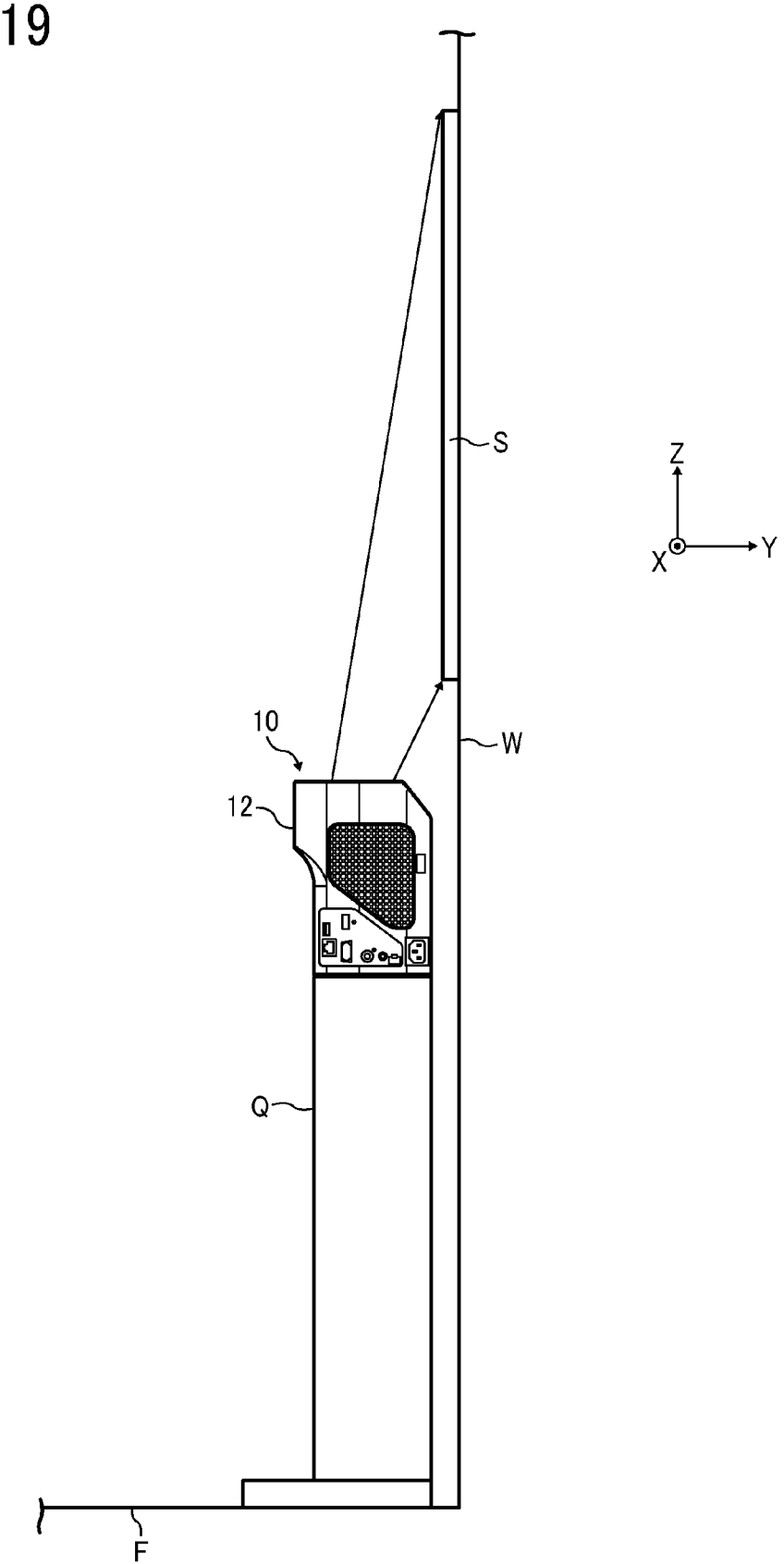
FIG. 19 shows another example of use environment of the projector.

In the above described example embodiment, the projector 10 is placed on a general purpose base such as the platform P. Further, instead of such general purpose base, the projector 10 can be placed on a specific base Q, which can be fixed with the projector 10 as shown in FIG. 19. When the projector 10 is fixed with the specific base Q to set a base-fixed projector, the distance between the projector 10 and the bottom end of the specific base Q may become longer. If an external force is applied to a side face of the projector 10, a moment caused by the external force becomes greater because the distance from a fulcrum (i.e., the bottom end of the specific base Q) to a line of action of force becomes too long, by which the projector 10 may lean. However, as above described, when the pushbutton is pressed, and the lever is moved (e.g., pivoted), an external force in the horizontal direction barely occurs to the projector 10, by which leaning of the base-fixed projector can be prevented.

Further, the projector 10 and the specific base Q can be integrated as one unit, or can be configured as separable units. The height of the specific base Q is set to a value preferable for the image projection from the projector 10 to the screen S such as 50 cm to 100 cm but not limited these. Further, the height and angle of the specific base Q can be adjusted by disposing an adjuster. Specifically, the adjuster may be three height adjustment legs disposed at the bottom face of the specific base Q while the three height adjustment legs are not on the same straight line.

In the above described example embodiment, the plurality of controls is disposed at the −X side area of the top face 38 of the housing 12, and the light projection port 40 is disposed at the +X side area of the top face 38 of the housing 12. However, the positions of the light projection port 40 and the controls can be switched.

In the above described example embodiment, types (functions), numbers, size, and shapes of the plurality of controls are not limited to any specific value, but can be changed as required.

In the above described example embodiment, the plurality of press-type controls employs pushbuttons. However, the press-type control can employ, for example, a press-type switch having two pressing portions for ON/OFF.

In the above described example embodiment, the focus adjustment lever 34 is disposed on the front face 26 of the housing 12 while the focus adjustment lever 34 can be moved (e.g., pivoted) about the Z-axis direction. Further, the focus adjustment lever 34 can be disposed on the front face 26 of the housing 12 by setting the moving direction of the focus adjustment lever 34 along the direction on the front face 26 of the housing 12, in which the focus adjustment lever 34 may be moved (e.g., pivoted) about the X-axis or Y-axis.

In the above described example embodiment, the focus adjustment lever 34 is disposed on the front face 26 of the housing 12 while the focus adjustment lever 34 can be moved (e.g., pivoted) about the Z-axis direction. Further, the focus adjustment lever 34 can be disposed on the front face 26 of the housing 12 by setting the moving direction of the focus adjustment lever 34 along the direction on the front face 26 of the housing 12, in which the focus adjustment lever 34 may be moved (e.g., pivoted) about the X-axis or Y-axis.

In the above described example embodiment, the external devices connectable to the projector 10 may be the USB memory M, the personal computer PC, and the DVD/video recorder R. Further, other external devices such as a USB memory, a personal computer, a DVD/video recorder, a liquid crystal monitor, an audio amplifier, a DVD player, and a video player can be used.

In the above described example embodiment, the LAN terminal 56 and the video input terminal 60 are not connected to corresponding cable, but can be connected to the cable as follows. For example, one end of a network cable is connected to a server on the Internet, and another end of the network cable is connected to the LAN terminal 56. For example, one end of an image cable is connected to an audio/visual (AV) device, and another end of the image cable is connected to the video input terminal 60.

In the above described example embodiment, the housing 12 has a rectangular parallelepiped shape. However, the shape of the housing 12 is not limited these. For example, the housing 12 can be shaped in a polygonal pillar shape, columnar or cylindrical shape, and ellipse pillar shape as long as the housing 12 has a top face and two side faces adjacent with each other and connected to the top face.

In the above described example embodiment, the projector 10 is used, for example, in a meeting room, but the use of the projector 10 is not limited these. Because the projector 10 is a portable and compact projector as above described, the projector 10 is not required to be set on a specific meeting room, but can be used at various locations.

Further, the housing 12 can be attached to, for example, a support pillar extending from a ceiling or a wall by setting the posture of the housing 12 upside down, or the housing 12 can be attached to the ceiling directly, in which the housing 12 is suspended on a ceiling.

Specifically, for example, the housing 12 may include a upside/downside detection sensor, and the legs 46 disposed on the base 24 of the housing 12 is fixed on the ceiling or the support pillar using a fixing members while setting the posture of the housing 12 upside down. The upside/downside detection sensor can be used to determine whether the housing 12 is attached with the upside down. Then, the light corresponding to image data is projected toward oblique downward direction via the light projection port 40.

In the above described example embodiment, the projector 10 is used, for example, for a meeting of a plurality of participants, but can be used for other purposes such as presentation.

The above described example embodiment is applied to the vertically-oriented projector, but can be also applied to the horizontally-extended projector.

In the above described example embodiment, the projector 10 is used, for example, for a meeting of a plurality of participants, but can be used for other purposes such as presentation.

In the above described short-focus projector, cables connected to a plurality of connection ports may not interfere the operation of the projector such as connection/disconnection operation, and the movement or positioning of users.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A projector, comprising:
   a housing having a top face, and a first face and a second face adjacent to each other, and a light projection port on the top face;
   an image projection unit including an optical system to project light corresponding to image data, via the light projection port disposed on the top face, in an upward oblique direction with respect to the first face; and
   a plurality of connection ports disposed on the second face, the plurality of connection ports including a power connection port disposed at a position in the second face closest to the first face side, wherein:
   the second face is formed of a first concaved portion and a second concaved portion,
   the first concaved portion is formed deeper than the second concaved portion with respect to an outer face of the housing,
   the first concaved portion is formed at a position closer to the first face compared to the second concaved portion,
   connection ports other than the power connection port are disposed in the second concaved portion, and
   the power connection port is disposed in the first concaved portion.

2. The projector of claim 1, wherein the first concaved portion is formed where the second face and the first face intersect.

3. The projector of claim 1, wherein the housing encases a heat generation device, and includes a gas-flow port disposed on the second face,
   wherein the plurality of connection ports is disposed at a position on the second face lower than the gas-flow port.

4. The projector of claim 1, wherein the housing includes a base face having an area smaller than an area of the first face.

5. The projector of claim 1, wherein the entire housing is substantially rectangular in shape.

6. The projector of claim 1, wherein the housing has a front face, the front face includes a lower part, a middle part, and a lower part.

7. The projector of claim 6, wherein the middle part connects the lower part and the upper part with a smooth curved face.

8. The projector of claim 6, further comprising a light detecting unit disposed at a top center of the upper part of the front face of the housing.

9. The projector of claim 8, wherein the light detecting unit includes:
   a light sensor at its center to receive optical signals coming from a remote controller, and
   a light emitting diode (LED) disposed near the light sensor.

10. The projector of claim 8, further comprising an audio releasing port disposed at a lower center of the upper part of the front face of the housing, wherein the audio releasing port is lower than the light detecting unit.

11. The projector of claim 10, further comprising a window disposed at a center of the middle part of the front face of the housing, wherein the window is lower than the audio releasing port.

12. The projector of claim 11, wherein a focus adjustment lever having a knob is set in the window.

13. The projector of claim 12, wherein the focus adjustment lever is mechanically coupled to a projection lens in the image projection unit.

14. The projector of claim 12, wherein the knob of the focus adjustment lever is inserted into the window from an inner side of the housing and has a size so that an edge of the knob does not protrude from a face of the middle part of the front face of the housing.

15. The projector of claim 1, wherein at an upper end of the first face includes a sloped portion.

16. The projector of claim 1, further comprising a gas-intake port disposed at a center portion of the second face.

17. The projector of claim 16, wherein the gas-intake port includes a frame and a lattice structure arranged in the frame.

18. The projector of claim 17, wherein the lattice structure includes a plurality of vertical lattice members, a plurality of horizontal lattice members, and a plurality of column members.

19. The projector of claim 18, wherein each of the column members includes a protruded portion which protrudes from the lattice structure.

20. The projector of claim 1, wherein the first concave portion is formed at a portion of the housing where the first and second faces intersect each other.

* * * * *